United States Patent
Marrion, Jr. et al.

(10) Patent No.: US 6,408,429 B1
(45) Date of Patent: *Jun. 18, 2002

(54) MACHINE VISION SYSTEM FOR IDENTIFYING AND ASSESSING FEATURES OF AN ARTICLE

(75) Inventors: Cyril C. Marrion, Jr., Acton; Ivan A. Bachelder, Newton, both of MA (US); Edward A. Collins, Jr., N. Smithfield, RI (US); Masayoki Kawata, Ohmiya (JP); Sateesh G. Nadabar, Framingham, MA (US)

(73) Assignee: Cognex Corporation, Natick, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/522,885

(22) Filed: Mar. 10, 2000

Related U.S. Application Data

(63) Continuation of application No. 08/784,406, filed on Jan. 17, 1997.

(51) Int. Cl.[7] .................................................. G06F 9/45
(52) U.S. Cl. ......................................................... 717/1
(58) Field of Search ............................................. 717/1

(56) References Cited

U.S. PATENT DOCUMENTS

| | | | |
|---|---|---|---|
| 4,064,394 A | 12/1977 | Allen ............................. 717/1 |
| 4,315,315 A | 2/1982 | Kossiakoff ...................... 717/1 |
| 4,445,137 A | * 4/1984 | Panofsky .................... 358/101 |
| 4,455,619 A | 6/1984 | Masui et al. .................... 717/3 |
| 4,656,603 A | 4/1987 | Dunn ............................. 716/1 |
| 4,663,704 A | 5/1987 | Jones ............................. 717/1 |
| 4,677,587 A | 6/1987 | Zemany, Jr. .................... 703/2 |
| 4,725,970 A | 2/1988 | Burrows et al. ................ 703/2 |
| 4,729,105 A | 3/1988 | Thompson et al. ......... 700/219 |
| 4,744,084 A | 5/1988 | Beck et al. ..................... 703/2 |
| 4,831,580 A | 5/1989 | Yamada .......................... 717/2 |
| 4,849,880 A | 7/1989 | Bhaskar et al. ................. 717/3 |
| 4,868,785 A | 9/1989 | Jordan et al. ................ 345/440 |
| 4,872,167 A | 10/1989 | Maezawa et al. ............. 714/38 |
| 4,901,221 A | 2/1990 | Kodosky et al. ............. 345/771 |
| 4,914,568 A | 4/1990 | Kodosky et al. ............. 345/763 |
| 4,914,586 A | 4/1990 | Kodosky et al. ............. 707/101 |
| 4,928,313 A | * 5/1990 | Leonard et al. ................. 382/8 |
| 4,956,773 A | 9/1990 | Saito et al. ..................... 717/3 |
| 5,095,204 A | * 3/1992 | Novini ........................ 250/223 |
| 5,113,565 A | 5/1992 | Cipolla et al. ............. 29/25.01 |

(List continued on next page.)

OTHER PUBLICATIONS

Solomon: "Visual Programming for a Machine Vision System" Technical Paper, Society of Manufacturing Enginers, MS92–175, pp. 175–175–14., Jun. 1–4, 1992.

(List continued on next page.)

*Primary Examiner*—Tuan Q. Dam
*Assistant Examiner*—John Q. Chavis
(74) *Attorney, Agent, or Firm*—Anthony Miele

(57) ABSTRACT

An improved vision system is provided for identifying and assessing features of an article. Systems are provided for developing feature assessment programs, which, when deployed, may inspect parts and/or provide position information for guiding automated manipulation of such parts. The improved system is easy to use and facilitates the development of versatile and flexible article assessment programs. In one aspect, the system comprises a set of step tools from which a set of step objects is instantiated. The set of step tools may comprise machine vision step objects that comprise routines for processing an image of the article to provide article feature information. A control flow data structure and a data flow data structure may each be provided. The control flow data structure charts a flow of control among the step objects. The data flow data structure includes a data flow connection providing access to portions of the data flow data structure for at least one of individual accessing and individual defining of a data source for a given step object.

44 Claims, 9 Drawing Sheets

U.S. PATENT DOCUMENTS

| | | | | |
|---|---|---|---|---|
| 5,133,075 | A | | 7/1992 | Risch .......................... 707/201 |
| 5,136,705 | A | | 8/1992 | Stubbs et al. ................. 714/27 |
| 5,166,985 | A | * | 11/1992 | Takagi et al. ................... 382/8 |
| 5,168,441 | A | | 12/1992 | Onarheim et al. ............ 700/17 |
| 5,231,675 | A | * | 7/1993 | Sarr et al. ....................... 382/8 |
| 5,255,363 | A | | 10/1993 | Seyler ......................... 707/526 |
| 5,261,043 | A | | 11/1993 | Wolber et al. .............. 345/809 |
| 5,291,587 | A | | 3/1994 | Kodosky et al. ............... 703/2 |
| 5,293,476 | A | | 3/1994 | Wolber et al. .............. 345/763 |
| 5,301,301 | A | | 4/1994 | Kodosky et al. ............. 700/86 |
| 5,301,336 | A | | 4/1994 | Kodosky et al. ........... 345/846 |
| 5,371,690 | A | | 12/1994 | Engel et al. ................ 382/151 |
| 5,475,851 | A | | 12/1995 | Kodosky et al. ........... 345/763 |
| 5,481,712 | A | | 1/1996 | Silver et al. ................... 717/1 |
| 5,481,740 | A | | 1/1996 | Kodosky .................... 345/839 |
| 5,481,741 | A | | 1/1996 | McKaskle et al. .......... 345/522 |
| 5,497,235 | A | * | 3/1996 | Bell ........................... 356/430 |
| 5,504,917 | A | | 4/1996 | Austin ........................ 345/522 |
| 5,576,946 | A | | 11/1996 | Bender et al. ................ 700/17 |
| 5,610,828 | A | | 3/1997 | Kodosky et al. ............... 717/1 |
| 5,659,624 | A | * | 8/1997 | Fazzari et al. .............. 382/110 |
| 5,703,688 | A | * | 12/1997 | Bell ........................... 356/430 |
| 5,703,784 | A | * | 12/1997 | Pearson ...................... 700/223 |
| 5,732,277 | A | | 3/1998 | Kodosky et al. ............... 717/4 |
| 5,734,863 | A | | 3/1998 | Kodosky et al. ............. 703/27 |
| 5,742,504 | A | | 4/1998 | Meyer et al. ................. 700/83 |
| 5,784,275 | A | | 7/1998 | Sojoodi et al. ............... 700/86 |
| 5,847,953 | A | | 12/1998 | Sojoodi et al. ............... 700/83 |
| 5,862,372 | A | | 1/1999 | Morris et al. .................. 717/1 |
| 5,887,073 | A | * | 3/1999 | Fazzari et al. .............. 382/110 |
| 5,905,649 | A | | 5/1999 | Sojoodi et al. ............... 700/83 |
| 5,920,479 | A | | 7/1999 | Sojoodi et al. ............... 700/86 |
| 5,940,296 | A | * | 8/1999 | Meyer ......................... 700/83 |
| 6,122,065 | A | * | 9/2000 | Gauthier ..................... 356/394 |

OTHER PUBLICATIONS

Brown:. "DSP design with DADiSP", Electronics World + Wireless World, Dec. 1989, pp. 1152–1154.

Buxbaum:, "Scientific/Industrial Image Processing on the Mac", Advanced Imaging, Apr. 1991, pp. 22, 24, 26, 28 & 31.

"Reviews", MacUser, Jul. 1991, pp. 82–87, 89–91.

Mort, et al:, "Low cost image analysis workstation which is menu driven and extensible", Medical Imaging IV: Image Capture and Display, Proceedings, SPIE—The International Society for Optical Engineering, vol. 1232, pp. 380–385 & 387–389.

Hollinger, et al:, "A Six-Pack for the Mac", ESD: The Electronic System Design Magazine, Jun. 1989, pp. 26–28, 30, 32, & 35–37.

Sensor Review: the International Magazine of Sensing for Industry, vol. 10, No. 4, (2 pgs).

Morris:, "Image processing on the Macintosh", Product Reviews, Reader Service, Aug. 1990, pp. 103–107.

"Reviews", MacUser, Jul. 1990, pp. 55, 57 & 58.

Kleinman: "The Macintosh as a Scientific/Industrial Image Processing Platform", Advanced Imaging, Apr. 1991, (16 pages).

L. G. Shapiro et al., "INSIGHT: A Dataflow Language for Programming Vision Algorithms", IEEE 1986 Computer Vision and Pattern Recognition, 1986, pp. 375–380.

A. Meygret et al., "Segmentation of Optical Flow and 3D Data For the Interpretation of Mobile Objects", IEEE, 1990, pp. 238–245.

M. Flicker et al., "An Object–oriented Language for Image and Vision Execution (OLIVE)", SPIE vol. 1568 Image Algebra and Morphological Image Processing II (1991), pp. 113–124.

D. Scott Dyer, "A Dataflow Toolkit for Visualization", IEEE Computer Graphics & Applications (1990), pp. 60–69.

Craig Upson et al., "The Application Visualization System: A Computational Environment for Scientific Visualization", IEEE Computer Graphics & Applications (1989), pp. 30–42.

Paul Otto et al., "Design and Implementation Issues in VPL, A Visual Language For Image Processing", SPIE vol. 1659 Image Processing and Interchange, (1992), pp. 240–253.

John Rasure et al., "Image Processing and Interchange: Implementation and Systems", SPIE vol. 1659 Image Processing and Interchange, (1992), pp. 300–310.

Michael E. Clarkson, "An Intelligent User Interface for the Detection of Arbitrary Shapes by Mathematical Morphology", SPIE vol. 1769 Image Algebra and Morphological Image Processing III, (1992), pp. 82–93.

James Martin, et al., "A Consumer's Guide to Diagramming Techniques"; Diagramming Techniques for Analysts and Programmers, (1985); Chapter 23, pp. 327–348.

James Martin, et al., "Data Flow Diagrams" Diagramming Techniques for Analysts and Programmers, (1985): Chapter7, pp. 93–108.

Tilak Agerwala, et al., "Data Flow Systems", *Computer*, Feb., 1982, pp. 10–14.

"Images" Imaging Technology; Winter 1998; pp. 1–6.

Checkpoint Marketing Materials; Cognex, 1995.

"Cognex Announced On–Sight in Detroit"; Mass High Tech; Jul. 1, 1990; pp. 4.

"Vision System Offers Power, Easy–Of–Use", Advanced Manufacturing Technology, v11, n7, Jul. 15, 1990; pN/A.

"New Players, Different Strategies in Robotics"; Metalworking News; Jun. 18, 1990; p. 5.

Michael Fallon; "New robots and vision systems emphasize ease of use"; Aug., 1990; Plastics Technology, v36, n8, p37(4).

Cathy Rossi; "Cognex preps easy–to–use vision system"; Metalworking News, Jun. 4, 1990; v17, n788, p4(2).

Thompson, et al., Cognex Presentation at New York Society of Security Analysts; Business Wise, 1990.

Cognex Next–Generation Machine Vision System Combines Power With Ease of Use; Jun. 5, 1990 p1.

Alison Calderbank; "Macs Mix Among Robots: Macintosh developers display their wares" Macintosh News; Jun. 18, 1990; p12.

"Vision System is Easily Configured"; Advanced Manufacturing Technology; Oct. 15, 1990; v11, n10, pN/A.

"Cognex Corp. Establishes Support and Marketing Office in Japan"; Dec. 3, 1990; News Release p1.

Gary Slutsker, et al.; "The vision thing"; Forbes; Dec. 10, 1990, v146, n13, p284(2).

Mark McLaughlin; "Visions of an Expanding 1991"; Boston Globe; V238 N183 sl p76.

"Vision Restored"; Design News; Feb. 25, 1991; p91.

"Cognex Corporation Company Report"; May 4, 1990; p1–1.

Raines Cohen; "GTFS tunes up imaging application, instrument library for Lab View"; MacWeek, v6, n8, p6(1); Feb. 24, 1992.

William B. Ackerman, "Data Flow Languages", *Computer*, Feb., 1982, pp. 15–25.

Alan L. Davis & Robert M. Keller, "Data Flow Program Graphs", *Computer*, Feb., 1982, pp. 26–41.

Arvind & Kim P. Gostelow, "The U–Interpreter", *Computer*, Feb. 1982, pp. 42–49.

D. D. Gajski, et al., "A Second Opinion on Data Flow Machines and Languages", *Computer*, Feb., 1982, pp. 58–69.

Ian Watson & John Gurd, "A Practical Data Flow Computer", *Computer*, Feb., 1982, pp. 51–57.

Cognex 4000/5000 SMD PGP Technical Guide Fiducial Finder, Revision B, Cognex Corporation, Chapter 4—Training a Model, 1995, p. 18.

Cognex 4000/5000 SMD PGP Technical Guide Fiducial Finder, Revision B, Cognex Corporation, Chapter 5—Searching for a Fiducial Mark, 1995, pp. 25–35.

"*IPLab Users's Guide*", Signal Analytics Corporation, 1989, 1990, 1991.

"*Ultimage User's Manual*", Image processing and analysis software for the Apple Macintosh II, Graftek France, 1988.

Steven Rosenthal and Larry Stahlberg, Automatix Inc.: "*New Approach to Machine Vision Application Development*", International Robots & Vision Automation Conference, 1990; Detriot, Michigan, US.

Andrew W. Davis & Ari Berman, Recognition Technology, Inc.: "*Intergrated Software Package for Machine Vision*" Interantional Electronic Imaging Exposition & Conference, 1987; Anaheim, California.

*The Itran 8000* (Product Brochure), Itran Corporation; Manchester, NH; 1983.

\* cited by examiner

MACHINE VISION SYSTEM FOR IDENTIFYING AND ASSESSING FEATURES OF AN ARTICLE

This is a continuation of application Ser. No. 08/784,406, filed Jan. 17, 1997.

BACKGROUND OF THE INVENTION

1. Reservation of Copyright

The disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

2. Field of the Invention

The present invention relates to a machine vision system for identifying and a assessing (i.e., characterizing) features of an article. The assessments may include determining the position of one or more features and/or inspecting features of the object to determine if they conform to a set of constraints. An aspect of the present invention relates to a system for developing feature assessment programs. The resulting programs, when deployed, can be used to inspect parts and/or provide position information for guiding automated manipulations of such parts.

3. Description of Background Information

Machine vision systems play an important role in automated systems. Cameras are used to obtain images of articles, and image processing is performed to identify features of the article. Further image processing may be performed to identify the article's position, measure its dimensions, and/or to check for article defects. Image processing results may then be used to aid in the control of automated systems, such as factory equipment, including, for example, an industrial controller, a robotic arm, or a positioning table. Such machine vision systems may aid in the inspection, assembly, and/or handling of various types of articles, parts, and devices, including automotive parts (e.g., fuses, gaskets, and spark plugs), electrical components (e.g., connector pins, keyboards, LED, LCD, VFD displays), medical and pharmaceutical products (e.g., disposable test kits, syringes, needles, and date-lot codes), and consumer products (e.g., razor blades and floppy disks).

Whenever a new article, part, or device is inspected by a given machine vision system, the vision processing component of the machine vision system will usually be modified and provided with a new inspection program for the new item. The vision processor will typically include a different visual inspection program for each type of device. For example, a system for automatically assembling (mounting) surface-mounted devices (SMDs) may have a vision processor which uses a unique visual inspection program for assessing each SMD as part of the mounting process.

Many SMD placement manufacturers will use a vision processor in their automated SMD placement system, in order to increase production rates and to accommodate accuracy demands associated with SMDs having dense, fine-pitch leads. In such systems, accurate siting of SMDs is accomplished using a different inspection program for each type of SMD involved. For example, COGNEX's SMD Placement Guidance Package provides unique respective software programs for large-leaded device inspections, front lit small-leaded device inspections, back lit small-leaded device inspections, front lit chip inspections, and so on. Further information about such software systems and subsystems is provided in the COGNEX 4000/5000 SMD Placement Guidance Package User's Manual Release 3.1, PN590-1039, Cognex Corporation (1996), the content of which is hereby expressly incorporated herein by reference in its entirety.

New or odd form SMDs which do not fall into any one of the categories for which inspection programs are already available require that a new inspection program be developed. The difficulty, however, with creating a new inspection program is that sophisticated programming skills are required, and there are usually delays in the development and perfection of a new inspection program for a new or odd-form SMD. New inspection programs will not be immediately available whenever a new or odd-form SMD emerges. For this reason, manufacturers or assemblers may consider delaying the introduction of a new or odd form SMD into a product, force-fitting an existing inspection program to accommodate the new device, or otherwise mounting (e.g., manually mounting) the SMD.

The complications associated with creating a new vision inspection program increase for multiple field of view (MFOV) inspections, i.e., inspections performed using more than one field of view (FOV). The geometry of some devices will make it impossible to successfully run an inspection program using only one FOV, i.e., a single field of view (SFOV). MFOVs are required either when the device is very large or when the device has fine details that must be picked up in the image data. When the device has fine details, the resolution of the image of the device must remain high, which requires that the physical space corresponding to each field of view be much smaller than the total device.

In order to accommodate such limitations in the field of view size, the scene is divided into several fields of view. A scene is an area of physical space, which may include the device and a portion of the background, that should be considered in order to perform a successful inspection. The scene may comprise the complete device and background information surrounding the device, or it may comprise only portions of the device that are needed to perform the inspection. When the complete scene cannot be captured with one image within the field of view of a single camera, while maintaining adequate resolution of the image, the scene must be divided into several such images or fields of view called multiple fields of view (MFOVs).

The lead pitch and other small features of today's and upcoming SMDs are decreasing in size. Such fine SMD features will require higher image resolution, which will likely cause MFOV inspections to become more commonplace.

One type of conventional article assessment development system includes standard development software provided by Cognex, which includes a library of high-level vision software and image processing tools. It also includes system software designed to facilitate code development and debugging.

In order to create a vision-based inspection program with these COGNEX products, a user writes a C-language program that connects the software blocks appropriate for a desired feature identification and assessment.

Another type of development system which may be used to create a vision-based system for identifying features of an article and assessing those features is the CHECKPOINT system, provided by COGNEX. The CHECKPOINT system uses a graphical user interface for aiding in the development of vision programs. A developer may utilize the CHECKPOINT interface to combine high-level vision, I/O and operator interface tools with conventional programming elements. Such conventional programming elements can include menu-selected program statements, such as conditional statements (If/Then, If/Else), assigning a value or result of an expression to a variable name (Set/Set Reference), defining conditional or iterative looping (For/While/Break/Next), using or invoking a function, or ending a function and returning a value (Call/Return), calculating the value of an expression (Calc), jumping to a statement (Go to/Label), and providing program comments (Notes).

Such program statements are built automatically from a dialog input box. As these system commands are entered, the CHECKPOINT system checks the entered commands for syntax errors. The CHECKPOINT system is also provided with dialog boxes for inputting important tool parameters, windows for accessing data and functions of the checkpoint development system, and debugging capabilities. The system is also provided with a mechanism for simple editing of a vision routine by using statements to cut, copy, and paste utilities.

The COGNEX standard development software is flexible and facilitates the development of inspection programs. On the other hand, the CHECKPOINT system uses a more simplified user interface and provides more guidance to aid in faster and easier development of inspection programs. There is a need for an improved inspection program development system which will be flexible and sophisticated, and will facilitate quicker development of inspection programs without requiring a high level of programming proficiency.

4. Definitions of Terms

The following term definitions are provided to assist in conveying an understanding of the various exemplary embodiments and features disclosed herein.

Class

A data structure descriptive of (defining basic attributes of) objects which may be instantiated therefrom.

Computer-Readable Medium

Physical material, including, for example, a disk, tape, a RAM, a ROM, and so-on for storing computer-readable information. A computer-readable medium may comprise one or more data storage media, and, if plural data storage media are utilized, those media may comprise different types of media.

Device Space

A coordinate system using physical units (e.g., microns) to describe features of a device with respect to a reference point fixed with respect to the device.

Field of View (FOV) or Single Field of View (SFOV)

Image data representing an image obtained by a single image acquisition. Usually, a single field of view comprises image data corresponding to the area of physical space that a particular camera acquires as image data.

Image Space

A coordinate system using virtual units (e.g., pixels) to describe features of a device.

Install

To set up and prepare for operation. For example, when a step object is installed, it is set up and prepared for operation.

Instance

An object created (by allocating memory therefor) from a particular class.

Instantiate

To create an object which is an instance of a class.

Library

A collection of routines, or a collection of objects, modules, or other entities which each comprise one or more routines.

Module

A collection of routines and data structures. A module will include an interface, which comprises constants, data types, variables, and routines accessible by other modules or routines, and code (accessible only to the module) which facilitates implementation of the routines into the module.

Multiple field of view (MFOV) inspection

An inspection process performed using more than one FOV. Partial inspection processes may be performed on each field of view, and all partial inspections then combined to create a final result.

Object

A variable comprising both routine(s) and data treated discretely from the routine(s).

Physical Space

A coordinate system using physical units to describe features of a device with respect to a reference point that is independent of the device.

Routine

A section of code which can be invoked (executed) within a program being run by a computer.

Scene

Image data corresponding to an area of physical space used to perform an inspection. A scene may include all of an article and a portion of the background.

SUMMARY OF THE INVENTION

The present invention is provided to improve upon machine vision systems for identifying and assessing features of an article. The present invention may be further provided to improve upon systems for developing feature assessment programs, which, when deployed, may inspect parts and/or provide position information for guiding automated manipulations of such parts. In order to achieve this end, one or more aspects of the present invention may be followed in order to bring about one or more specific objects and advantages, such as those noted below.

One object of the present invention is to provide an improved easy-to-use system for developing vision-based article assessment programs.

A further object of the present invention may be to provide such a program development system which facilitates the development of versatile and flexible article assessment programs.

The present invention, therefore, may be directed to a method or system, or one or more parts thereof, for facilitating the identification and assessment of features of an article. Such a method or system may involve the development of feature assessment programs, which, when deployed, may inspect articles and/or provide position information for guiding automated manipulation of such articles.

In accordance with one aspect of the present invention, a system may be provided which comprises, among other elements, a set of step tools from which a set of step objects is instantiated. The set of step tools may comprise machine vision step objects that comprise routines for processing an image of the article to provide article feature information. A control flow data structure and a data flow data structure may each be provided. The control flow data structure charts a flow of control among the step objects. The data flow data structure includes a data flow connection providing access to portions of the data flow data structure for at least one of individual accessing and individual defining of a data source for a given step object.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present invention throughout the several views and wherein.

The integrated inspection processing system 40 may be configured to have a development mode, in which a user may create, debug, and test an inspection program. This might be done by stepping through the intermediate executions of each step object 54 (one inspection step at a time) and viewing on a computer screen, e.g., via GUI 48, intermediate results as they are obtained. The integrated inspection processing system 40 may further comprise a deployment mode, where the inspection program is deployed and thus behaves like any other SMD SFOV or MFOV device inspection program.

Figure 5:
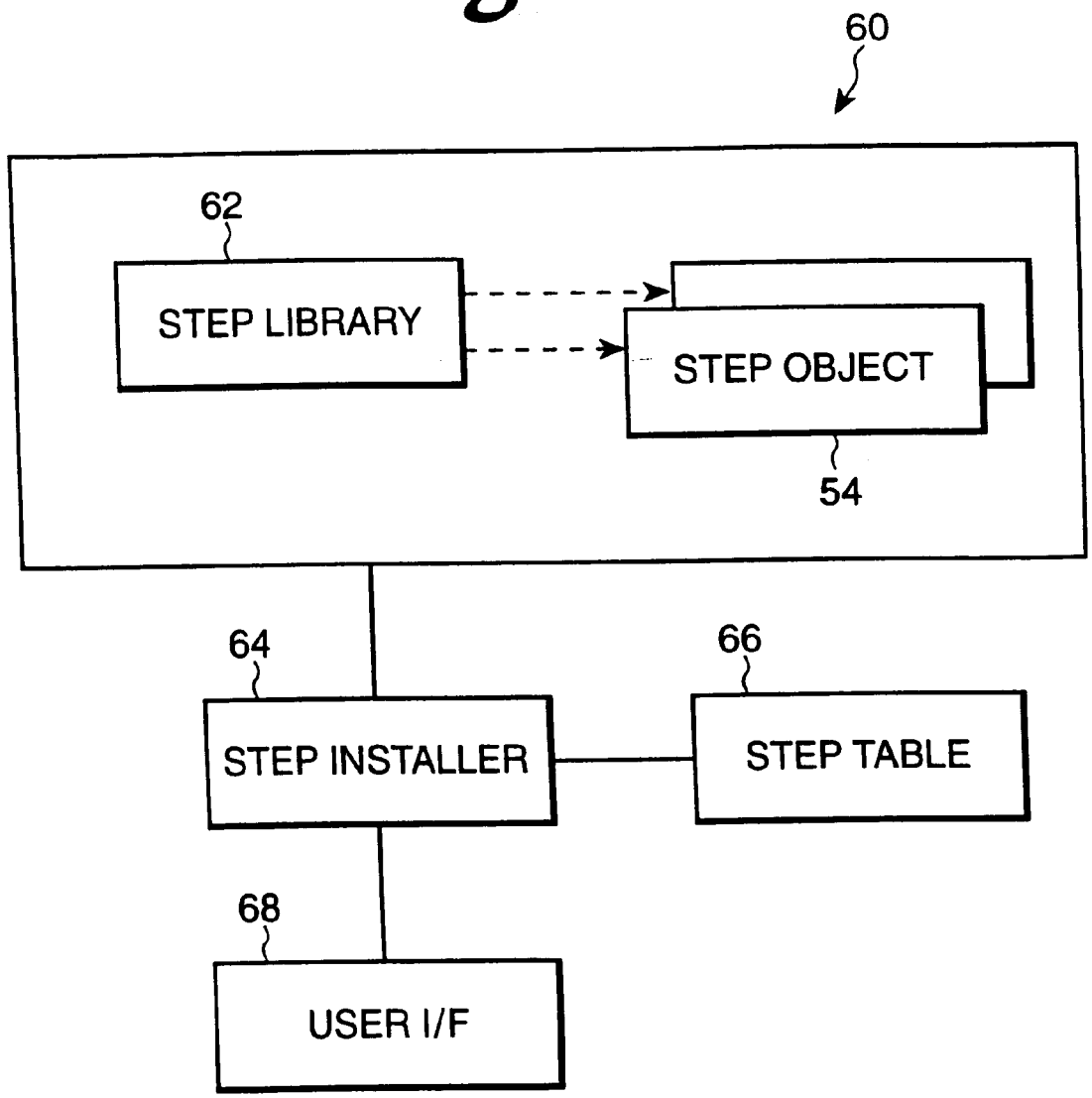
Figure 6:
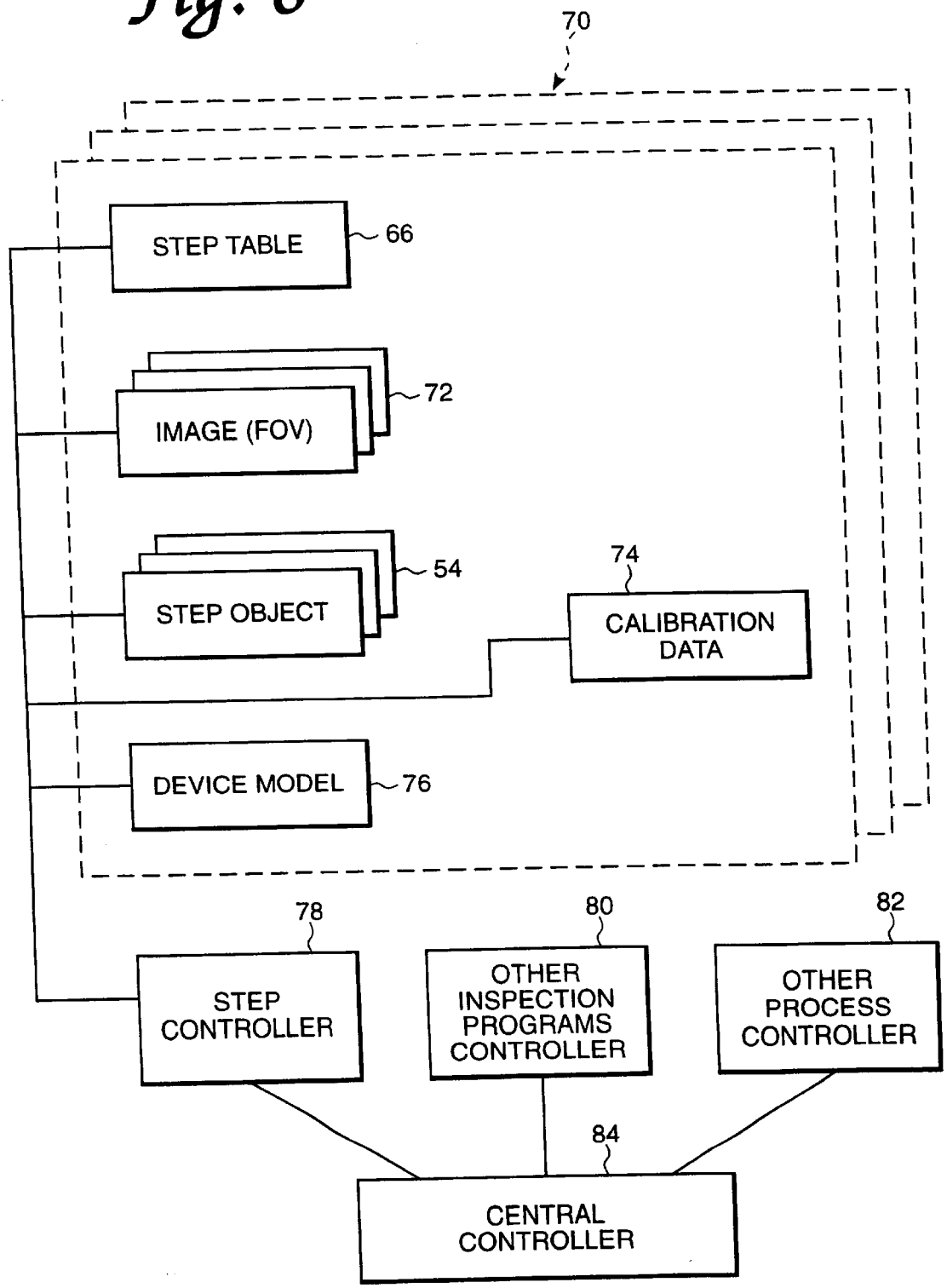
Figure 7:
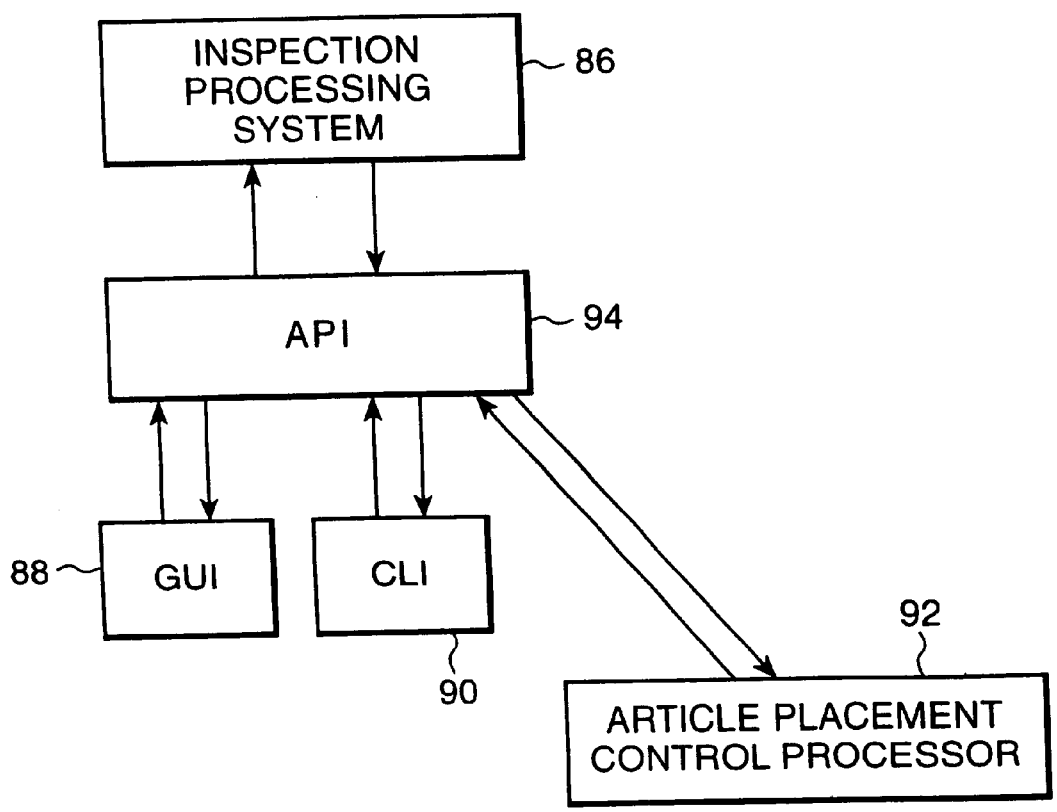
Figure 8:
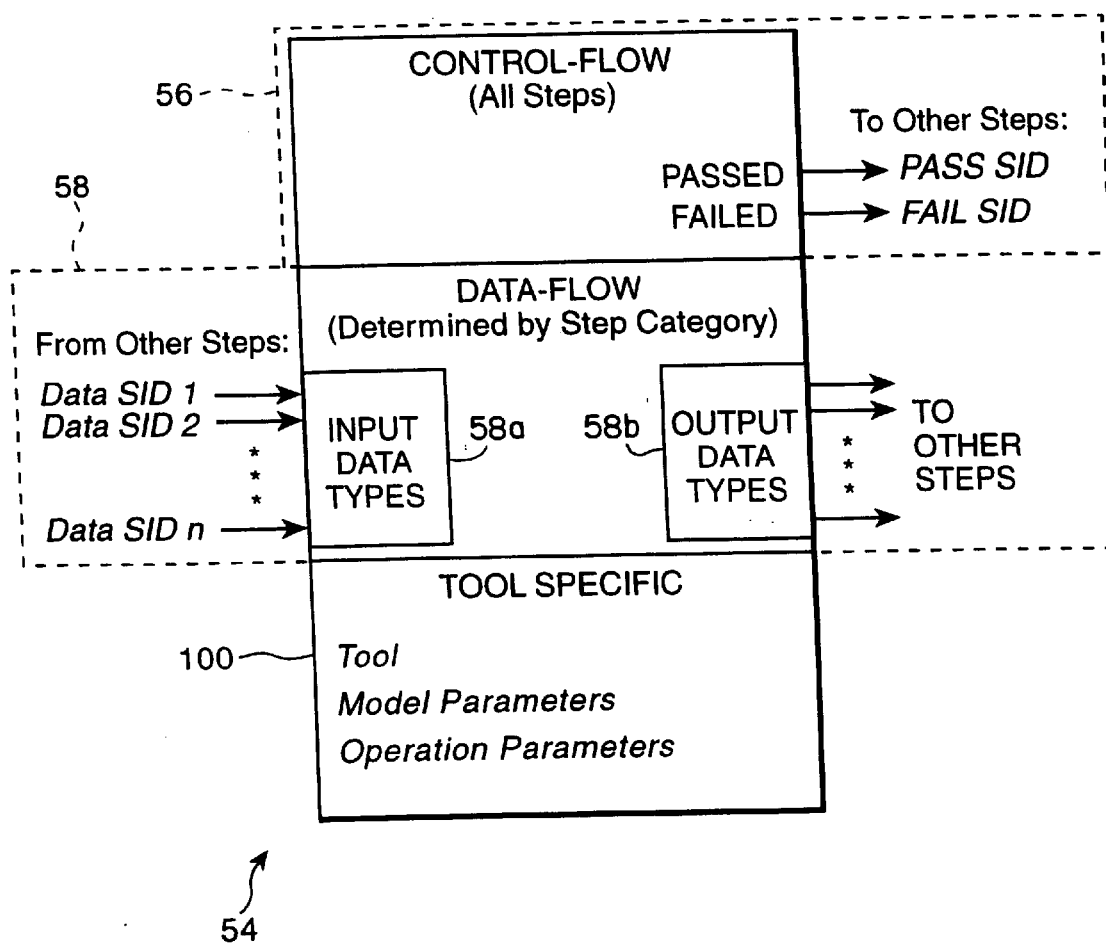
Figure 9:
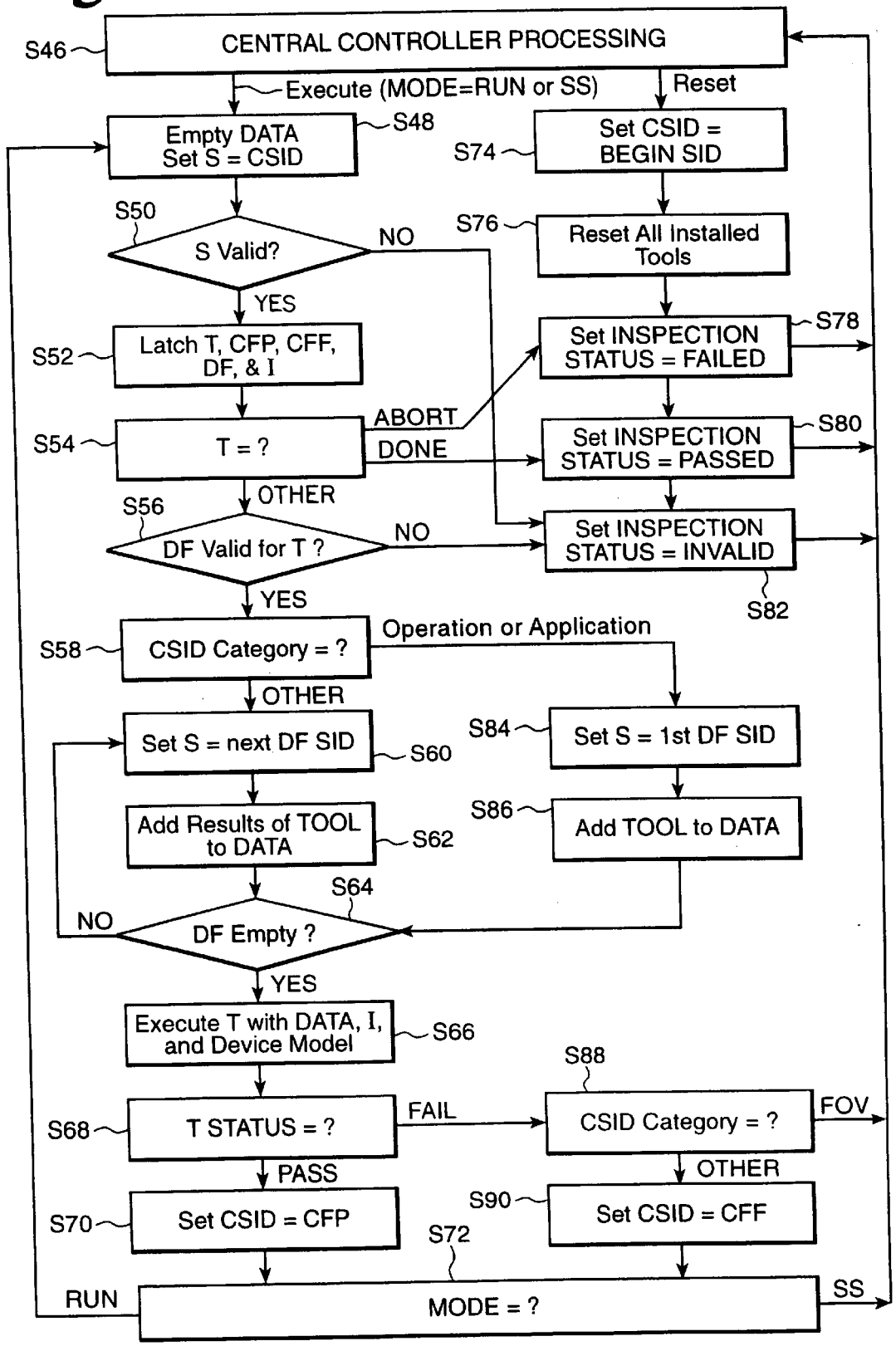

FIG. 5 is a block diagram of an exemplary embodiment of an inspection program development system according to the present invention;

FIG. 6 is a block diagram of an exemplary embodiment of an inspection program deployment system according to the present invention;

FIG. 7 is a block diagram of an exemplary embodiment illustrating the interfaces among an inspection processing system (development and/or deployment), a user, and another device such as an article placement control processor;

FIG. 8 is a diagram of an exemplary embodiment of an instantiated step object; and FIG. 9 is a flow chart of a process that may be performed by the step controller shown in FIG. 6.

DETAILED DESCRIPTION OF AN EXEMPLARY EMBODIMENT

Figure 1:
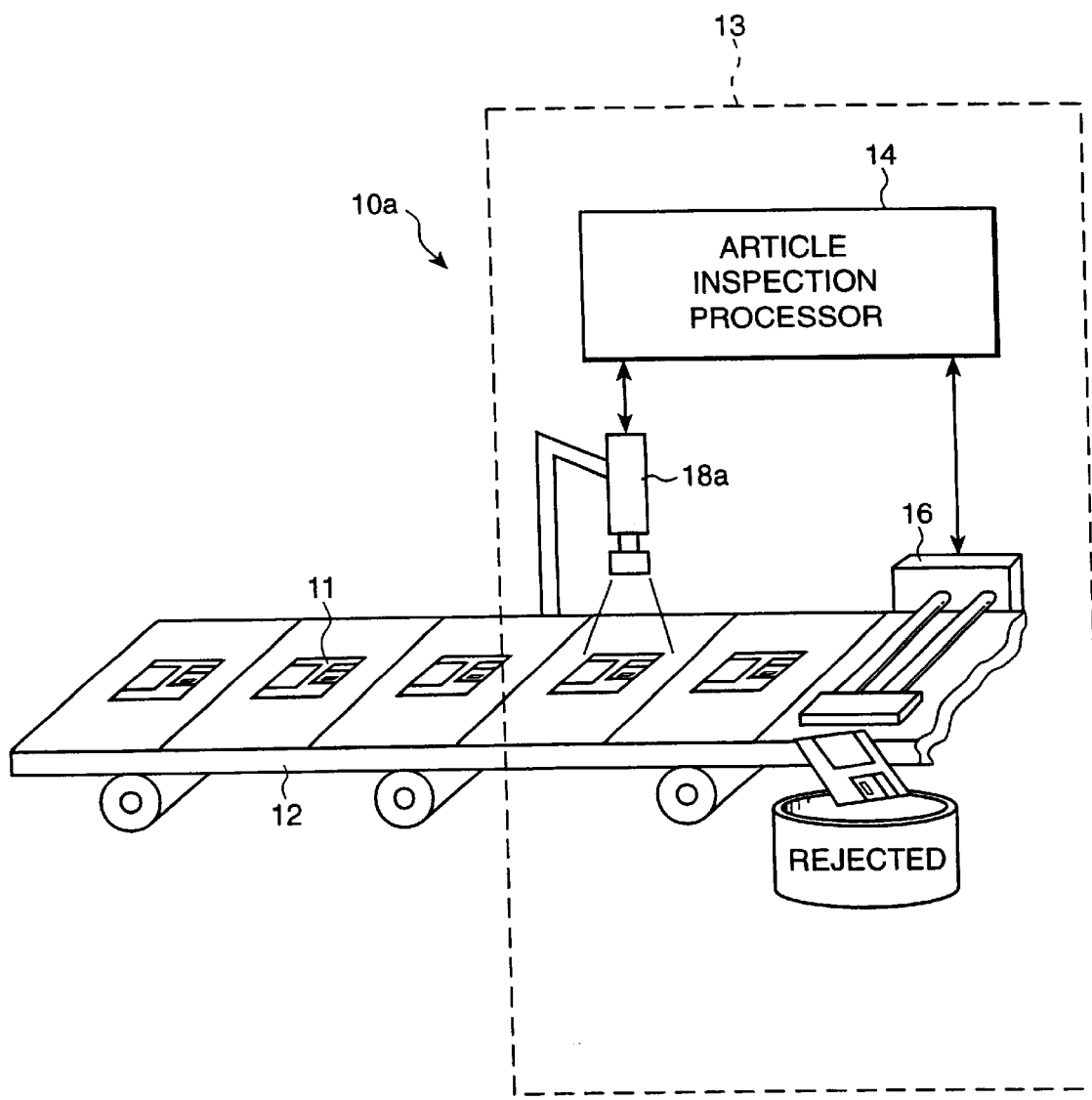
FIG. 1 is a simplified diagram of one type of automated part manipulation system.
Figure 2:
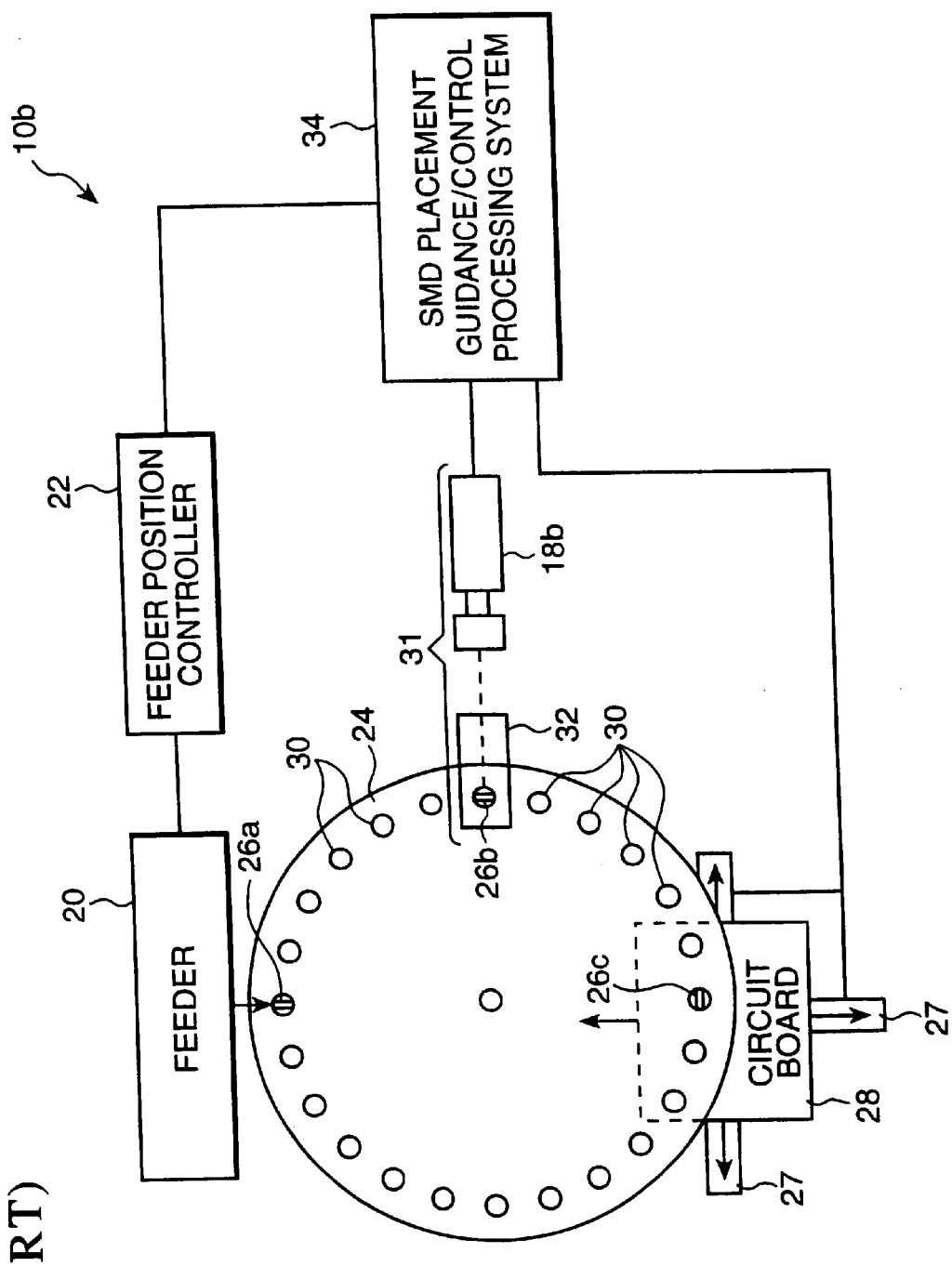
FIG. 2 is a simplified diagram of another type of automated part manipulation system, i.e., a turret-type SMD mounting system.
Figure 3:
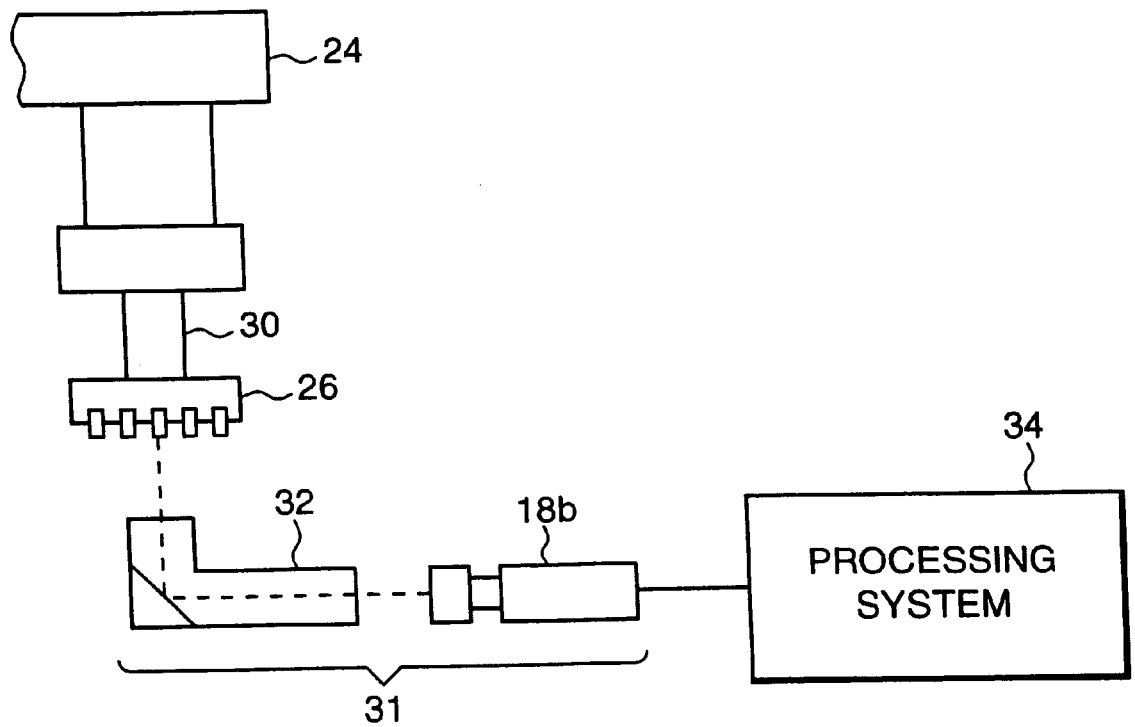
FIG. 3 is a side view of portions of the SMD mounting system shown in FIG. 2.

FIGS. 1–3 illustrate some exemplary automated systems 10a, 10b for processing or otherwise acting upon articles of a similar type in a repeated and automated fashion. FIG. 1 shows an automated system 10a which comprises a conveyor belt 12 supporting a plurality of articles (here, floppy disks) 11. An inspection subsystem 13 is provided as part of automated system 10a, and comprises, among other elements, an article inspection processing system 14 coupled to a camera 18a and a diverter 16.

The camera 18a obtains image data corresponding to a scene which may include the area encompassing all pertinent portions of article 11 and the area around article 11. The resulting image data of the scene is then forwarded to article inspection processing system 14 for subsequent inspection processing. If the article passes the inspection, article 11 is kept on conveyor 12, for subsequent processing or handling. However, if the inspection fails, the article may be removed from the conveyor by a diverter 16.

FIG. 2 shows an automated system 10b, which comprises a turret-type SMD mounting system. As shown in FIG. 2, such a system may comprise, among other elements, mounting elements, including a turret mounter 24, an SMD feeder 20, and a feeder position controller 22. The illustrated system further comprises a circuit board X-Y position controller 27, an image acquisition subsystem 31, and an SMD placement guidance and control processing system 34.

The image acquisition subsystem 31 comprises a mirror assembly 32 and a camera 18b, which may comprise a CCD camera.

In operation, a circuit board 28 is supported by X-Y board position controller 27, which positions circuit board 28 for mounting of SMDs 26 onto circuit board 28. Feeder 20 feeds SMDs onto turret mounter 24. Turret mounter 24 supports each SMD with a vacuum nozzle 30. For that purpose, turret mounter 24 comprises a large number of vacuum nozzles 30 periodically positioned about the periphery region of the under-side surface of turret mounter 24.

The system illustrated in FIG. 2 may be provided with a fiducial camera (not shown) for obtaining image data used to identify fiducial descriptions located on circuit board 28.

The automated system 10b employs vision processing for guiding the placement of the SMDs 26 onto circuit board 28. A vision processing component of processing system 34 may perform such processing functions as system calibration, failed board identification, board alignment, device inspection, and placement site location.

During system calibration, the image acquisition subsystem 31 obtains an image and the vision processing component of processing system 34 will learn the relationship between picture elements (pixels) and physical units. Images obtained by image acquisition subsystem 31 may also be used by the vision processing component of processing system 34 to identify defects, for example, by locating marks placed by manufacturers on failed circuit boards 28, indicating that such boards should not be populated.

Board alignment is performed after the circuit board 28 is inspected, but before placement of a particular SMD. Inspection of the SMDs is then performed based upon image data obtained by image acquisition subsystem 31. Finally, before placement of an SMD on circuit board 28, the precise site location on circuit board 28 is identified, and the position of circuit board 28 is guided, as a result of an SMD position assessment program run by processing system 34. Based upon the placement guidance information provided, the control portion of processing system 34 will then direct the manipulation of both SMD 26 and circuit board 28 to effect mounting of the SMD.

FIG. 3 provides a side view of portions of the SMD mounting system shown in FIG. 2. A portion of turret mounter 24 is shown, together with a single vacuum nozzle 30 which is holding an SMD. Image acquisition subsystem 31 includes a mirror assembly 32 which directs light reflected off of SMD 26 toward an image plane of camera 18b.

Figure 4:
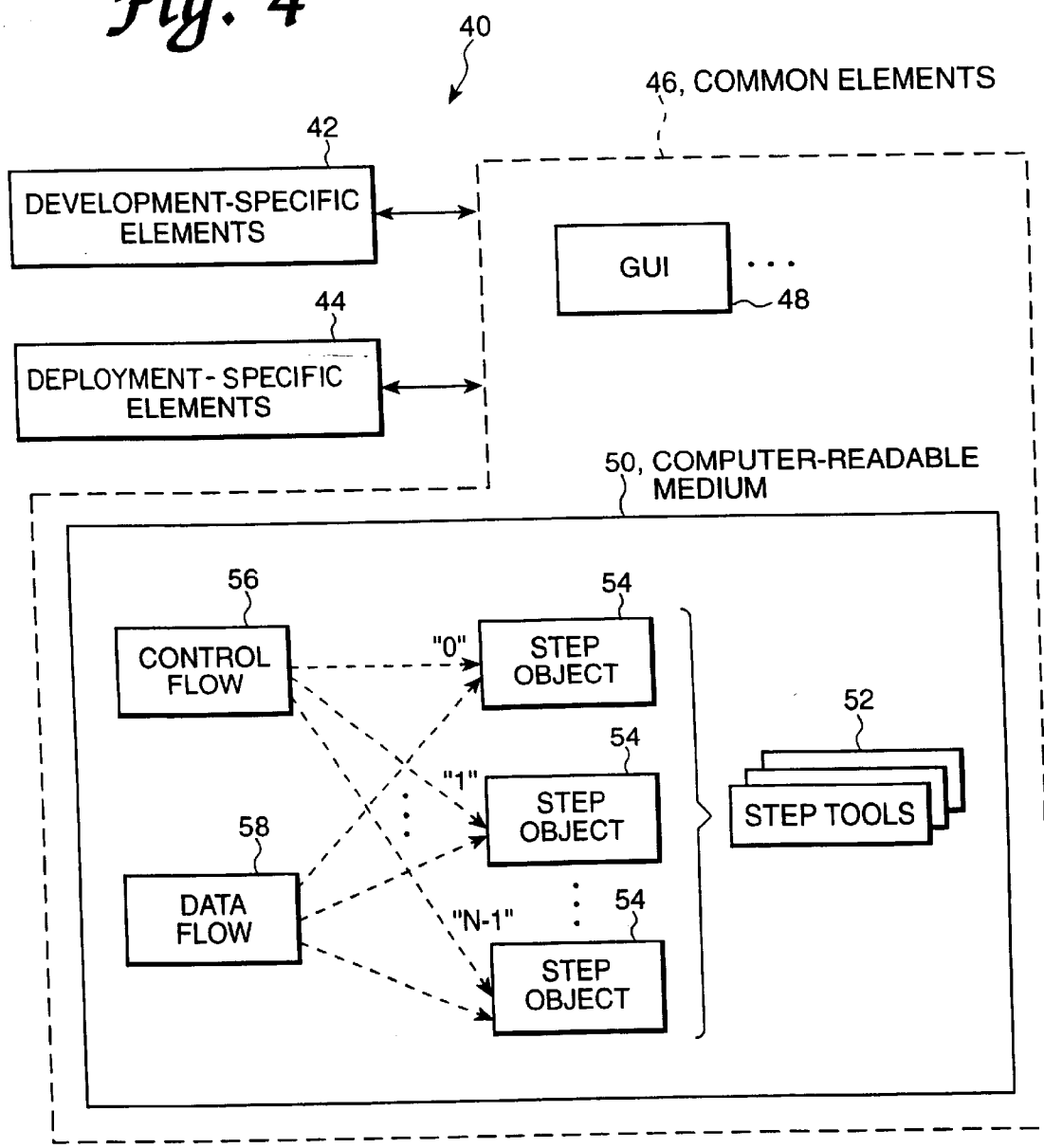
FIG. 4 is a block diagram of an exemplary embodiment of an integrated inspection program processing system of the present invention.

FIG. 4 is a block diagram of an exemplary embodiment of an integrated inspection processing system 40 of the present invention.

Integrated inspection processing system 40 generally comprises a development-specific element 42 (e.g., a special interface which aids in the development of an inspection program), deployment-specific elements 44 (e.g., a command interface which can be used to control the deployment of inspection programs), and common elements 46.

Common elements 46 comprise such items as a user interface, for example, a graphical user interface (GUI) 48, and a computer-readable medium 50 encoded with a program. The program may comprise a set of step tools 52 from which a set of step objects 54 may be instantiated, a control flow data structure 56, and a data flow data structure 58.

Step objects 54 comprise, among other elements, machine vision step objects that comprise routines for processing an image of an article to provide article feature information. Control flow data structure 56 charts a flow of control among step objects 54, and comprises a control flow connection which provides access to portions of control flow data structure 56 to facilitate at least one of individual accessing and individual defining of a following step object 54 specified by control flow data structure 56 to follow a given step object 54. A plurality (0, 1, . . . N−1) of step objects 54 together comprise the general routines and interconnections needed to perform an inspection program.

Data flow data structure 58 charts a flow of data among step objects 54, and comprises a data flow connection. The data flow connection provides access to portions of data flow data structure 58 for facilitating at least one of individual accessing and individual defining of a data source for a given step object 54.

The set of step tools 52 may facilitate the instantiation of other types of step objects, which do not comprise machine vision step objects, but rather are management/program flow type of step objects. These management/program flow step objects facilitate the development of an inspection program and/or they may facilitate the deployment of a resulting inspection program formed with both machine vision type step objects and management/program flow type step objects.

In other words, the step tools may comprise machine vision step tools from which machine vision step objects are instantiated and program flow step tools from which program flow step objects are instantiated. The machine vision step objects may comprise routines for processing an image of the article to provide article feature information, while the program flow step objects comprise routines for managing transitions to or from the machine vision step objects.

In order to facilitate the flow between step objects, so that the end deployment of a resulting inspection program is not limited to a particular ordering of the step objects, the flow of control may be specified by separately specifying for a given individual step object a first following step object for one type of result of a routine of the given step object and a second following step object for another type of result of the routine of the given step object.

In the specific embodiment illustrated herein, the first type of result is a FAIL result, while the second type of result is a PASS result. By way of example, an edge detection routine may be performed as part of a particular machine vision step object. If the edge detection performed by that step object results in a successful determination of an edge, the result would be a PASS type of result, and the first following step object could be defined as a new machine vision step object. On the other hand, if the edge detection routine portion of the given step object is not determinable, then the type of result of that routine would be a FAIL result, in which case a second following step object may entail modifying or obtaining new parameters used to perform that edge detection.

FIG. 5 is a block diagram of an exemplary embodiment of an inspection program development system 60. The illustrated inspection program development system 60 is shown to comprise a user interface 68, a step installer 64, a step table 66, a step library 62, and a plurality of step objects 54.

An inspection program development system 60 as illustrated in FIG. 5 will allow a user to easily develop an inspection program by combining vision processing functions taking into account the characteristics of a new or odd form device to be inspected (such as body and lead measurements) that are directly measurable from physical instances of the device or that may be ascertainable by other means such as mechanical drawings. The illustrated inspection program development system 60 will further facilitate the designation of the control flow between vision processing functions performed by the inspection program and the sources of data used by each vision processing step within the resulting inspection program.

More specifically, the illustrated inspection program development system 60 shown in FIG. 5 may allow a user to develop an inspection program by specifying such parameters as:

(1) A geometric device model for a target device class.

(2) A set of step objects, instantiated from a set of tools, which may comprise a hierarchical tool library. Tools may be categorized in accordance with input/output characteristics (data types). Some tools that are provided in the library provide machine vision capabilities (being tools from which machine vision step objects are instantiated), while other tools are program flow tools (from which program flow step objects are instantiated) which manage transitions to or from machine vision step objects. Such managing of transitions to or from machine vision step objects may entail direction of the flow of data and/or control into and out of a system deploying the resulting inspection program.

(3) A specification of the control flow between step objects, based upon the execution-time success or failure of each step object.

(4) A specification of the data flow between instantiated step objects, in accordance with tool category input/output data types.

An inspection program may be developed by specifying these types of information. More specifically, a user may interact with user interface 68 and install each step object by specifying its parameters within a step table 66. Such parameters may include control-flow information, data-flow information, device model information, and tool parameters.

The inspection program development program 60 shown in FIG. 5 may operate as follows. Step library 62 may comprise a variety of both machine vision and program flow tools, instances of which are available for installment as inspection steps into step table 66 by step installer 64. Step installer 64 may receive inspection step installation commands originating from user interface 68, which specify particular tools within step library 62 to be installed, together with control flow information, data flow information, and operational and model parameters corresponding to each specified tool to be installed. Upon receiving such a command, and the accompanying information, step installer 64 creates an instance of a specified tool in the form of a step object 54, and as part of installing that tool, places information identifying the instantiated step object together with other specified data (control-flow information, data-flow information, operational and model parameters) into step table 66.

Each instantiated step object 54 may be uniquely identified (indexed) by an inspection step ID (SID). An SID may identify a tool category, to be defined further hereinbelow, together with an index value, such as a number. Data flow information and control flow information may be specified in step table 66 in the form of providing an SID representing the identity of a step from which data for the present step object will originate, while control flow information may be specified in step table 66 by specifying an identification, SID, of a step object to which the control flow will proceed depending upon the result of execution of the functions of that given step object. Step installer 64 will also provide identifying information, in the form of a model index, for each instantiated step object.

Step installer 64 may also be configured to respond to inspection step inquiry commands originating from user interface 68. Such an inquiry command would specify the SID being inquired about. Step installer 64 may respond to the specified SID by extracting from step table 66 control-flow SIDs, data-flow SIDs, and operational and model parameters for the installed step object corresponding to that SID. In addition, step installer 64 may be provided with a mechanism for deleting installed step objects from step table 66, in response to an appropriate request or command, which may originate from user interface 68 or from elsewhere.

FIG. 6 is a block diagram of an exemplary embodiment of an inspection program deployment system 70. The illustrated inspection program deployment system 70 is shown to comprise one or a plurality of deployments which may be implemented within a given computer system, and they may comprise software program residing on a computer-readable medium. Each deployment may comprise, among other elements, a step table 66, image data (comprising one or more fields of view) 72, and a set of instantiated step objects 54. Calibration data 74 and device model information 76 may also be provided, but may be put in a central location common to all of the deployments of the deployment system.

These plural deployments may comprise different inspection programs which together are used in an overall article inspection and manipulation system.

The deployments of the inspection programs are coupled to a step controller 78, which is in turn connected to a central controller 84. Central controller 84 is further connected to other inspection programs controller 80 and other process controller 82.

Step controller 78 receives inspection commands from central controller 84 and relays inspection data from the inspection program back to central controller 84. It may further control the execution of the inspection steps as specified in the set of step objects 54, while using other information in step table 66, image data 72, calibration data 74, and device model information 76. It will control execution of an inspection program in accordance with step objects 54 and control-flow and data-flow SIDs specified in step table 66. Step controller 78 further receives FOV data from image data 72 which may be created using an image acquisition system together with calibration data 74. The device model relevant to a particular deployed inspection program may be specifically identified in step table 66, as noted above.

Other inspection programs controller 80 may comprise a mechanism for controlling the deployment of other standard inspection programs, for example, inspection programs that are commercially available and direct the inspection of standard devices. For example, such standard inspection programs may comprise software programs for large-leaded device inspections, front lit small-leaded device inspections, back lit small-leaded device inspections, front lit chip inspections, and so on, depending upon the types of devices being handled by the overall automated system.

Other process controller 82 may control processes such as the handling and manipulation of the device. For example, should the automated system comprise an SMD mounting system generally as shown in FIG. 2, other process controller 82 may facilitate the gathering of an SMD onto a vacuum nozzle 30 and subsequent mounting of SMD 26 onto a circuit board 28 with the use of a turret mounter 24.

Central controller 84 may be provided to control the overall operation of each of the categories of programs handled by step controller 78, other inspection programs controller 80, and other process controller 82, respectively. Central controller 84 may further serve as an interface point through which a user can control operation of the entire system, turn the system on or off, and otherwise adjust parameters before, during, or after operation of one or more pieces of the overall system.

FIG. 7 is a block diagram of an exemplary embodiment which illustrates the interfaces among an inspection processing system 86 (which may comprise a development and/or deployment system) and a user and/or another device, such as an article placement control processor 92. The system shown in FIG. 7 includes an inspection processing system 86 coupled to an application program interface (API) 94. A graphical user interface (GUI) 88 and a command line interface (CLI) 90, are each coupled to a text-based (or other code-type (e.g., binary code)) API 94. An article placement control processor 92 is further coupled to API 94.

The interface between inspection processing system 86 and API 94 may be a command/response type of interface. Similar command/response interfaces may be provided between API 94 and GUI 88, CLI 90, and article placement control processor 92, respectively. The specific embodiment illustrated in FIG. 7 illustrates such interfaces with the use of bidirectional arrows.

API 94 may comprise a command/response processor, or an API such as the SAPP interface which is a product commercially provided by COGNEX.

Two alternate types of user interfaces may be provided, including GUI 88 and CLI 90. GUI 88 may comprise a sophisticated graphical user interface which makes it easier to develop inspection programs, and to control the deployment of an inspection program in a sophisticated manner, but in a manner which is more simple and easier for the user to understand. On the other hand, should just simple command line interface be sufficient to control the deployment of an already-developed inspection program, a simple CLI 90 may be used.

A CLI 90 may comprise a common CLI which already exists in many present-day mounting systems and other types of automated systems. Accordingly, an already-existing CLI can be used to turn on and control deployment of the custom-created inspection programs created with the use of the inspection processing system 86 of the present invention, while using that same CLI is also used to control and turn on other inspection programs and processes associated with the inspection and manipulation of an article. API 94 further acts as a generic intermediary between inspection processing system 86 and an article placement control processor 92, which may use a particular type of interfacing protocol for interacting with an inspection processing system, whether the inspection processing system be an inspection program development system and/or an inspection program deployment system.

The CLI 90 may be configured so that it can interpret specialized ASCII or binary commands, while the GUI 88 may be configured so that it can interpret graphical and/or textual inputs.

FIG. 8 is a diagram of an exemplary embodiment of the overall structure of an instantiated step object 54. Instantiated step object 54 may comprise, among other elements, a control flow data structure 56, a data flow data structure 58, and a tool specific data structure 100. Control flow data structure 56 may be designed so that it is of similar construction for all tools within step library 62.

As shown in the exemplary embodiment of FIG. 8, the control flow data structure 56 comprises two control flow directions, including a PASS control flow direction indicator, and a FAIL control flow direction indicator. Those control flow directions are identified with the use of a PASS SID and a FAIL SID which identify respective first and second following step objects to which the control flow will move in execution of the inspection program. Data flow data structure 58 is shown in the example embodiment of FIG. 8 as comprising information identifying input data types, and that information may be identified with the use of SIDs corresponding to other step objects from which data is obtained for the present step object 54.

Data flow data structure 58 further includes a data structure for identifying input data types 58*a*, and another data structure for identifying output data types 58*b*. The output data types will then serve as input data for other step objects 54, should another step object 54 identify, by identifying a data type and an SID, that particular data as its input.

The step objects of the present invention, for example as shown in the example embodiment of FIG. 8, may include three main categories of information, including control flow information, data flow information, and tool parameters.

The control flow controls the flow between step objects, and may be specified on a step-by-step basis. The user may identify, at installation time, the next step to be executed, depended upon the execution result of the present step object 54. Accordingly, the flow of control between step objects may be specified in a manner comparable to a "state machine," which can be represented by or with the use of a control flow graph, or a comparable simplified mechanism using a graphical user interface. Such a control flow graph could provide diagnostic feedback to a user while an inspection program is under development. It could also provide a graphical mechanism for specifying the flow of control by allowing the user to graphically connect the inspection steps.

This flexible control flow data structure makes it possible to efficiently implement retry strategies (inspection steps to perform in the event any of the inspection steps of a given strategy fail) for both SFOV and MFOV inspection, by specifying control tree structures. It also makes it possible to implement iterative strategies, forming control loops which could be executed during deployment of a resulting inspection program. Finally, this control flow data structure can facilitate the implementation of either open loop or closed-loop MFOV inspection programs. Open-loop and closed-loop MFOV inspection programs will be further explained hereinbelow.

In the specific embodiment illustrated herein, the control flow may be specified as follows:

PASS SID: The inspection step ID of the inspection step containing the step object to execute after the present step object corresponding to the current inspection step has finished executing and has resulted in a PASS result.

FAIL SID: The inspection step ID of the inspection step containing the step object to execute after the step object corresponding to the current inspection step has finished executing and has resulted in a FAIL result.

The data flow between inspection steps may also be specified on a step-by-step basis, with the use of the data flow data structure 58 of the illustrated embodiment. The user may name, at installation time, each of the inspection steps that will provide the installed inspection step with its required input data. The system may be implemented so that one data originating inspection step is identified for each input of the present step object. Of course, only certain step objects (inspection steps) will be allowable "data providers" for any given input data type, which will be specified with use of an input data type data structure 58*a*.

As was noted above for control flow, a data-flow graph may be created, for example, with an appropriate application program together with a graphically used interface, identifying inspection steps as nodes, and data connections with, for example, arcs. Such a graph may serve as a diagnostic feedback to the user for graphically viewing an inspection program, or even a graphical mechanism for specifying the flow of data by allowing the user to graphically connect inspection steps to each other.

This flexible data flow data structure, for example, as shown in the specific illustrated embodiment, makes it possible to share both tools and data across different FOVs. It also allows more efficient implementations of both retry and iterative strategies (for example, using a REPEAT tool, described later herein). In addition, the flexible illustrated data flow data structure 58 allows inspection programs to conserve memory resources, by allowing tool output data to be removed with the use of a data flow or other type of management step object (e.g., a CLEAR tool, as described later herein). The data flow data structure of the embodiment shown in FIG. 8 may be defined as follows.

The requirements of such a data flow data structure may vary according to the tool category within which the present step object resides. A string of data SIDs may be specified to identify the data sources which will serve as the various inputs to the present step object. Such a string of identifiers may be in the form of Data SID 1, . . . , Data SID n. These are the ordered inspection step IDs of the inspection steps containing the tools from which the tool contained within the current inspection step obtains its input. One such SID may be specified for each of the n data inputs required by the tool contained in the current inspection step. Only SIDs for steps containing tools that are capable of providing input of the appropriate types for the tool contained in the current step are considered valid data SIDs.

Each installed step object will also have a set of parameters that governs its execution. Some of these parameters may pertain directly to the operation performed by the step objects. Others may implicitly describe geometric model data not contained in a device model. For example, measurements for the size of certain regions of the image may be required for some tools, and may be specified in terms of minimum, nominal and maximum sizes of device regions in the device model. Thus, model data may be widely distributed throughout a developed inspection program. An interactive graphical user interface may be provided to aid a user in setting up device coordinate space parameters for each tool, by graphically displaying geometric parameters in device space.

Tool specific information may be provided in the form of a tool specific data structure 100, and may be unique for each particular tool. Such a tool specific data structure may comprise the following information:

Tool: At installation time, the name of the desired tool must be specified. From this name (and model and operational parameters described below) step installer 64 (see FIG. 5) may be able to construct an instance of a step object from step library 62, and place that instance within step Table 66.

Model parameters: Certain tools may require information (e.g., indices) indicating portions of a central/target device model (if any) which the inspection tool will attempt to use. If a tool does not require a device model, or requires an entire device model, no parameter indices may be necessary.

Operational parameters: These parameters may simply comprise "other" parameters needed to adjust performance of the tool, or needed by the tool but not normally otherwise provided. These parameters may determine, for example, how the installed tool should precisely behave.

The user interface 68 of an inspection program development system 60, as shown in FIG. 5, may be provided with a mechanism for preventing the entering of illegal data, including invalid control flow or data flow data, invalid model data, and invalid device parameters, including model parameters and operational parameters. Such checking may be performed -on a step object by step object basis during the development of the inspection program, or may be deferred until a complete inspection program is created, and reset, or executed, in order to allow a user to build a complete inspection program incrementally.

As shown in FIG. 6, a device model 76 may be provided, and may comprise geometric model data, preferably specified in device coordinate space. There may be some physical and image coordinate space parameters that are also provided in some instances. The device coordinate space may be defined by the user before configuring the inspection program. This may be done by simply providing a calibration object and an initial device position estimate at execution-time. The device model may include tool-specific model data particular to certain steps forming the inspection program, and global geometric model data, such as body size, and lead location and size. The tool-specific model data may be implicitly contained within each of the step objects for each tool, and they may be directly specified by tool parameters corresponding to each step object. The global geometric model data may be assembled by the user, all at once, or in parts, and kept in a central location called a device model, such as device model 76 as shown in FIG. 6. This central device model structure 76 will facilitate the sharing of device model data by different tools in the inspection program, thus saving on memory and on the configuration time needed for each of the tools.

A GUI may be configured so that users can view and interactively change a device model. Such a GUI may contain a graphical editor as well as a numerical editor, and may allow a user to draw and graphically modify representations of a device model in device coordinate space (or other coordinates), the results of which may be automatically transferred in parameters necessary to install a central device model.

As shown in FIG. 6, a central controller 84 may be provided which manages the overall execution of an inspection program through the use of step controller 78. Such a central controller 84 may comprise a system which forms part of an automated mounting or article manipulation system.

During execution of an inspection program, images representative of the article being inspected may be obtained, e.g., by an image acquisition system controlled by central controller 84. Accordingly, in the illustrated embodiment, central controller 84 (which may be a mounter program) will communicate with the inspection program via step controller 78, and will provide image data to the inspection program as it executes its various steps in deployment of the inspection program.

When a single field of view (SFOV) inspection program is executed, an SFOV is provided to the inspection program deployment system 70, stored in image data section 72, and acted upon in accordance with the step objects 54. However, if a multiple field of view (MFOV) inspection program is being deployed, MFOVs will be provided on a per FOV basis by central controller 84 to step controller 78 and thus to the inspection program deployment system 70. When the inspection program deployment system 70 requests, via step controller 78, a next FOV during the execution of an MFOV inspection program, it may or may not suggest to central controller 84 a particular FOV position (e.g., in physical space). Central controller 84 will control the image acquisition system (not shown in FIG. 6) to obtain that next FOV data and forward the same back to inspection program deployment system 70 for storage in image data section 72 and for use by step objects 54.

MFOV inspection programs may be configured to execute any of a number of ways, e.g., as follows:

Independent Open-loop Mode

In this mode, the image tiling sequence may be completely determined by a central controller 84. Central controller 84 may acquire all of the fields of view (FOVs) before executing the inspection program, in which case the inspection program will execute to completion. In the alternative, central controller 84 may await the processing of each FOV by the inspection program before acquiring a next FOV, which will cause control to pass back and forth between step controller 78 and central controller 84. If the inspection program deployment system 70 is being implemented in an overall SMD mounting system, the mounter can be moved and/or FOV data can be acquired from a camera. It is important that central controller 84 facilitate a tiling sequence that is commensurate with a particular inspection strategy.

Dependent Open-loop Mode

In this mode, the image tiling sequence is completely determined by the inspection program, but the suggested positions of each FOV acquisition do not depend upon the current device position estimate, since they are specified in physical coordinate space at installation time. When control is passed from the inspection program deployment system 70 to central controller 84, central controller 84 uses the suggested FOV provided by inspection program deployment system 70 to acquire a next FOV data. This mode of execution is convenient, since it allows even a fixed tiling sequence to be contained in the inspection program, and relieves the requirement that central processor 84, or another external processor, have knowledge about the inspection strategy.

Closed-loop Mode

In this mode, the image tiling sequence is again completely determined by inspection program deployment system 70, but the suggested positions will depend upon the state of the inspection program execution, since the suggested position of a next FOV is specified in device coordinate space at installation time, which is converted into physical coordinate space at execution time using the current estimate of the device's position. This mode may be especially useful when the optimal tiling strategy depends upon the status of the inspection program, and when another external system, such as a mounting system, has the ability to move an image acquisition camera to various locations.

Hybrid combinations of the closed-loop and open-loop modes may be possible. For example, each of the above-described MFOV tiling strategies may be chosen on a per FOV basis, due, in part, to the step-by-step manner in which a set of step objects may be defined to create an inspection program in the illustrated embodiment of the present invention.

TABLE 1 exemplifies some of the tools that may form a step library 62, for example, as shown in FIG. 5. All of the tools provided in TABLE 1 are arranged hierarchically. At the top level of the hierarchy, all tools in the tool library contain a status, which is PASSED if it has executed since the last reset condition and was able to compute the information that it has been configured to provide, and FAILED otherwise. Some error code and appropriate message may be provided in the event of a FAIL status. Beyond this commonality, tools may be grouped into categories according to what they require for input and what provide as output.

In the illustrated embodiment, all inspection tools of a particular category require a number of inputs and provide a number of outputs with particular data types. Data types may include, for example, image data (an image and a calibration between image and physical coordinate spaces), threshold data (a grey scale threshold value), position data (an estimate of a device position in physical coordinate space), and feature data (features extracted from images with or without correspondences to model features).

Within each tool category, the tool library (step library) may offer a variety of different tools. Some examples are given in TABLE 1. Some of the tools provided in TABLE 1 comprise machine vision tools, while others are program flow tools, for example, data flow or program handling tools, which provide data flow or control flow functionality for interfacing between an inspection program deployment system 70 and a central controller 84, for example, as shown in FIG. 6. Such program flow tools include, in the illustrated embodiment, field of view (FOV), Termination, Application, and Operation categories (listed under the tool category). These program flow tools may include such tools as BEGIN, NEXT, DONE, ABORT, REPEAT, and CLEAR tools, which are listed under Available Tools. These program flow tools provide significant advantages to an inspection program developed in accordance with the embodiment provided herein, are described in TABLE 2, and are further described as follows.

The field-of-view (FOV) tools serve both control and data flow functions between the inspection program and an external entity, such as a central processor 84 as shown in FIG. 6. Each of these tools represents the control and data flow entry point into the inspection program following the acquisition of data (comprising image and calibration information) for a particular FOV in an image tiling sequence.

Installed FOV tools allow control to be temporarily passed back to another entity, such as a central controller 84, if necessary, in order to obtain data for the associated FOV in the image tiling sequence. In this situation, an FOV tool may provide a suggestion to the other entity for positioning the mounter/camera during the acquisition process. At this time, or at any time in which another processor such as a central controller 84 has control, FOV data can be routed from the image acquisition system to the appropriate installed FOV tool, simply by specifying the SID for the corresponding installed step. Upon return of control from this other entity (e.g., central controller 84) to step controller 78, execution may resume at the step containing the FOV tool, where it left off.

In terms of data flow, FOV tools are the keepers of their associated FOV data, and therefore may provide image-type data to other installed tools.

In addition, the BEGIN FOV tool may specify the starting point in an inspection program for a first FOV during an MFOV inspection, or a data entry point for image data during an SFOV inspection. This BEGIN FOV tool may be automatically installed when the inspection program is created, and there should be a need for only one BEGIN FOV tool per inspection program.

The flow of control, as specified, for example, by a step table, will thus typically always originate from the installed BEGIN FOV tool, following an inspection or whenever the inspection program is started or an inspection program reset and execution command is provided to inspection program deployment system 70. The inspection program development system 60, as shown in FIG. 5, may be implemented so that the BEGIN tool may never be deleted, but may be replaced with another step containing a BEGIN tool so that the control-flow configuration may be altered to specify the desired next inspection step to execute in the inspection program.

For an MFOV inspection, an inspection step containing a NEXT FOV tool may be manually installed by a user for each field-of-view beyond the first.

Termination tools serve as final data and control flow exit points from an inspection program. They may permanently return control from an inspection program deployment system 70 to another entity, such as central controller 84, along with the final results of an inspection program execution. Like the BEGIN FOV tool, termination tools may be automatically installed when the inspection program is created, and there will only be a need for one of each type of termination tool per inspection program.

The flow control may be set so that it always returns to a common entity, such as central controller 84, from an inspection step containing a DONE termination tool for passing inspections. For failing inspections, the flow of control may always return from the inspection step containing the ABORT tool.

Each application tool may be configured so that it must be manually installed by the user. Such application tools execute a version of a vision tool contained in another installed inspection step, at an entirely different point in the inspection program, and with its own independent control and data flow specifications. The input for application tools may comprise the tool to be applied, in addition to the data required for the applied tool.

A REPEAT application tool may be provided which executes an installed tool without any modifications in the tool-specific installation parameters. This application tool is particularly useful for repeating tools in different fields of view.

Each operation tool may comprise steps which require manual installation, and may perform some sort of operation on another vision tool contained in an installed inspection step. The input for operation tools may simply be a tool to be operated upon. The CLEAR operation tool resets the "state" of another installed tool, thereby freeing any result data associated with the other installed tool and any memory used to store that data.

FIG. 9 provides a flow diagram of the procedure that may be performed by a step controller, such as step controller 78 as shown in the deployment system illustrated in FIG. 6. Step controller 78 may follow such a procedure as shown in FIG. 9 to execute the inspection steps of a particular inspection program as specified in a step table 66, based upon commands received from another entity, such as central controller 84.

The illustrated procedure accommodates two modes of execution, including a development mode and a deployment mode. In the development mode, the user can set break points at inspection steps, and single-step through the inspection program, i.e., execute the inspection program one inspection step at a time. The user may further be able to change the control flow, data flow, model, and tool parameters on-the-fly, and re-execute the inspection program from various inspection steps. In the deployment mode, the inspection program behaves as any other device inspection program might. A GUI, if available, is not necessary to control deployment, since the inspection commands can be issued using a CLI.

Throughout the process illustrated in FIG. 10, step controller 78 may keep track of several pieces of information. Such information may include:

(a) A current SID (CSID) for inspection, which may be the SID of the inspection step that is currently executing or is about to be executed.

(b) The SID index (S) into the step table, containing the inspection step ID of the inspection step from which the step controller needs information.

(c) The tool (T) corresponding to the current inspection step.

(d) The PASS and FAIL control flow SIDs (CFP and CFF, respectively) for the current inspection step.

(e) The data flow SIDs (DC) for the current inspection step.

(f) The model index (I) for the current inspection step.

(g) The data set (DATA) to be used as input for the tool installed in the current inspection step. This data set comprises the result from various tools contained in the inspection steps indicated by the data flow SIDs for the current inspection step, and arranged in the same order as the data flow SIDs. This data may include tool instances.

(h) The mode (MODE), which indicates whether the inspection program is being executed in a development or a deployment mode. These modes are referred to in FIG. 9 as RUN and SS (standing for single step).

In the flow chart of FIG. 9, the flow of control originates with central controller 84, and thus originates with step S46, which represents central controller processing. Upon receiving an execution command from central controller 84, as part of central controller processing S46, step controller will begin its execution at step S48. Upon receiving a reset command from central controller processing S46, the process of step controller 78 will begin at step S74.

In step S48, the step controller will remove all data from (i.e., empty) the input data set DATA, and set the index SID S equal to the current SID (CSID). The process will then proceed to step S50, where it will check the validity of S by searching for it in the step table. If the index SID is not found, the process will move directly to step S82. Otherwise, the process will proceed from step S50 to step S52.

In step S52, the process will "latch" the current inspection step information contained in the step table (as indexed by the index inspection step ID, S) by setting T equal to the TOOL output of the step table, setting CFP and CFF equal to the PASS and FAIL SIDs from the step table, setting DF equal to the ordered set of data flow SIDs from the step table, and setting I equal to the index (if any) into the device model from the step table.

After step S52, the process will proceed to step S54, where a determination will be made as to what type of tool the current Tool is. If the current Tool is an ABORT tool, the process will move directly to step S78. If the current Tool is a DONE tool, the process will proceed to step S80. Otherwise, the process will move on to step S56.

In step S56, the validity of the data flow SIDs (DF) is checked by searching for each DF in the step table. If no DFs are found, the process will move to step S82. Otherwise, the process will proceed to step S58.

Steps S58, S60, and S62 are responsible for assembling output data from all data providers indicated in the data flow SIDs into DATA. In step S58, if the category of the current SID (CSID) is an Operation or an Application, the process will go to step S84. Otherwise, the process will proceed to step S60. In step S60, the next data flow SID will be extracted from DF, i.e., removed, and the index SID (S) will be set equal to this SID. The process will then proceed to step S62, where the results of TOOL, extracted from the step table using the inspection step index SID (S), are added to DATA.

The process will then proceed to step S64, where a determination will be made as to whether DF is empty. If it is not empty, the process will return to step S60. Otherwise, the process will proceed to step S66.

In step S66, the current Tool will be executed with the tool T, DATA, the device model, and the model index I as input. The process will then proceed to step S68, where a determination is made as to the status of the Tool. If the status is PASS, the process will proceed to step S70. Otherwise, the process will proceed to step S88. In step S70, the current SID (CSID) will be set to the PASS SID (CFP). Then the process will proceed to step S72.

In step S72, a determination is made as to whether the MODE is equal to RUN, or is equal to SS. If it is equal to RUN, the process returns to step S48. If it is equal to SS, the process returns to control by the central controller, and thus returns to central controller processing step S46.

In step S74, the current SID (CSID) is set equal to the SID of the step containing the BEGIN tool. Then the process proceeds to step S76 where all tools in the step table are reset.

Then, in step S78, the inspection status is set to FAILED, and control is returned to the central controller 84, thus returning to step S46.

In step S80, the inspection status is set to PASSED, and then control is returned to the central controller, thus returning to step S46.

In step S82, the inspection status is set to INVALID, and the control is then returned to the central controller, thus returning to step S46.

In step S84, the first data flow SID from DF is extracted, i.e., it is removed, and the index SID (S) is set equal to this SID. Then the process proceeds to step S86, where TOOL is added from the step table for index S to DATA. The process then proceeds directly to step S64.

In step S88, if the category of the current SID (CSID) is FOV, control will be returned to the central controller, and thus return to step S46. Otherwise, the process will move on to step S90. In step S90, the CSID is set to the FAIL SID (CFF). The process then proceeds to step S72.

TABLE 3 shows an example step table configuration for what might be characterized as a typical SFOV inspection program. The comments provided in the table describe the strategy behind the inspection program. TABLE 4 shows an example step table configuration for a more complicated MFOV inspection program. In this particular example, the inspection program makes use of three FOVs, expecting to find the first lead set in the model in the first two FOVs and a second lead set in the third FOV. Note that several retry strategies can be found in this program. When a particular step fails, it is often possible to simply move on to the next FOV and resume the program. Another feature illustrated in this example is the use of REPEAT Application steps to repeat the lead scan tool (configured for a particular lead set) in two FOVs, as well as the use of a CLEAR Operation step to eliminate image results contained in the first and second FOV tools when they are no longer needed by the program.

For purposes of simplification, the example programs shown in TABLES 3 and 4 do not specify tool specific operation parameters. For example, neither show suggested FOV positions that may or may not be made by the BEGIN and the NEXT FOV tools, depending upon whether the inspection program will execute in a closed-loop or an open-loop mode.

The specifics of any particular embodiment of the present invention may vary widely, depending upon many different factors—the specific environment within which the present invention is implemented being just one example. Further example details and descriptions are provided in the following COGNEX documents: the SMD Placement Guidance Package User's Manual, Release 3.2, the SMD Placement Guidance Package User's Guide, Release 3.2.00 DRAFT, and the SMD Placement Guidance Package Oddform Device Inspection Tutorial, Release 3.2.00. The content of each of these documents is hereby expressly incorporated by reference herein in its entirety.

While the invention has been described by way of example embodiments, it is understood that the words which have been used herein are words of description, rather than words of limitation. Changes may be made, within the purview of the appended claims, without departing from the scope and spirit of the invention in its broader aspects. Although the invention has been described herein with reference to particular structure, materials, and embodiments, it is understood that the invention is not limited to the particulars disclosed. The invention extends to all equivalent structures, means, and uses which are within the scope of the appended claims.

TABLE 1

| Tool Category (examples) | Input Data Types | Output Data Types | Available Tools (examples) |
| --- | --- | --- | --- |
| Field-of-View (FOV) (data flow) Control, exit/ entry point for inspection program, containing new FOV expected locations and data. | Image (from central controller) Position | Image Position (position also returned to central controller) | BEGIN Control exit/ entry for 1st FOV. NEXT Control exit/ entry for MFOV inspections. |
| Termination (TERM) (data flow) Control exit point for the inspection program | Position | Position (to central controller) | DONE Normal exit point. ABORT Error exit point. |
| Application (APP) (data flow) Application of another installed tool. | a tool to be applied. input data types of applied tool. | output data types of applied tool. | REPEAT Repeat another installed tool (with input different and output data). |
| Operation (OP) (data flow) Perform some operation on an installed tool. | a tool to be operated upon. | none | CLEAR Reset another installed tool (reset the status and remove any results). |
| Image Processing (IMG) Process the input image and compute a new image. | Image Position | Image | REGION-OF-INTEREST (ROI) Compute a new image from a region in the input image. |
| Threshold (THR) Determine a threshold using image statistics. | image | Threshold | INTENSITY LOCATOR (IL) Use illumination statistics to compute a threshold. |
| Coarse Part Location (CPL) Estimate rough device position from an image. | Image Position Threshold | Position | BLOB Estimate rough device position from statistics of blob-like image regions. |
| Feature Extraction (FTX) Extract visual features from an image. | Image Position | Features | LEAD SCAN (LSCAN) Extract point features in an image corresponding to device lead tips. |
| Feature Correspondence (FTC) Correspond sets of | Image Position Features | Features | LEAD SCAN CORRESPONDER (LCORR) Correspond sets of |

TABLE 1-continued

| Tool Category (examples) | Input Data Types | Output Data Types | Available Tools (examples) |
|---|---|---|---|
| extracted features to model features. | | | extracted device lead tip features to model leads |
| Feature Fitting (FTF) Compute accurate device position by fitting corresponded extracted and model features. | Image Position Features | Position | LEAST SQUARES (LSQ) Compute accurate device model by minimizing the sum squared error between extracted and model features |

TABLE 2

| Tool | Tool Category | Description | Operation/Model Parameters |
|---|---|---|---|
| BEGIN | Field-of-View (FOV) | Control exit/entry for 1st FOV. Data entry point for 1st FOV. | Suggested position of the mounter/camera for the 1st FOV (in physical or device coordinates). |
| NEXT | Field-of-View (FOV) | Control exit/entry for MFOV inspections. Data entry point for all but 1st FOV. | Suggested position of the mounter/camera for the next FOV (in physical or device coordinates). |
| DONE | Termination (TERM) | Returns control to central controller. Returns device position data to command/ response processor | None |
| ABORT | Termination (TERM) | Returns control to central controller. Returns error to central controller. | None |
| REPEAT | Application (APP) | Repeats specified installed tool at execution time, with different control and data flows. | SID of the inspection step containing the tool to be repeated. |
| CLEAR | Operation (OP) | Resets the specified tool status and removes any tool results. | SID of the inspection step containing the tool to be reset. |

TABLE 3

| SID (category, index) | TOOL (name) | DATA FLOW (inputs) | CONTROL FLOW (next step) | MODEL INDEX | COMMENT |
|---|---|---|---|---|---|
| FOV-1 | BEGIN | none | IMG-1 (pass) TERM-2 (fail) | none | Start inspection |
| IMG-1 | ROI | FOV-1 (image) FOV-1 (position) | THR-1 (pass) TERM-2 (fail) | none | Create a region of interest (ROI) around the device |
| THR-1 | CIL | IMG-1 (image) | CPL-1 (pass) TERM-2 (fail) | none | Find a threshold within the ROI. |
| CPL-1 | BLOB | IMG-1 (image) FOV-1 (position) | FTX-1 (pass) TERM-2 (fail) | none | Using the threshold, use blob regions in the ROI to roughly find the device position. |
| FTX-1 | LSCAN | FOV-1 | FTC-1 | none | Use the rough estimate of |

TABLE 3-continued

| SID (category, index) | TOOL (name) | DATA FLOW (inputs) | CONTROL FLOW (next step) | MODEL INDEX | COMMENT |
|---|---|---|---|---|---|
| | | (image) CPL-1 (position) THR-1 (threshold) | (pass) TERM-2 (fail) | | device position to locate lead features in the first FOV. |
| FTC-1 | LCORR | FOV-1 (image) CPL-1 (position) FTX-1 (features) | FTF-1 (pass) TERM-2 (fail) | lead set index 1 | Find a correspondence between all the lead features found so far. |
| FTF-1 | LSQ | FOV-1 (image) CLP-1 (position) FTC-1 (features) | TERM-1 (pass) TERM-2 (fail) | none | Use all the corresponded features found so far to fit the device and accurately compute its position. |
| TERM-1 | DONE | FTF-1 (position) | any | none | Inspection finished with no error |
| TERM-2 | ABORT | FOV-1 (position) | any | none | The inspection finished with error |

TABLE 4

| SID (category, index) | TOOL (name) | DATA FLOW (inputs) | CONTROL FLOW (next step) | MODEL INDEX | COMMENT |
|---|---|---|---|---|---|
| FOV-1 | BEGIN | none | IMG-1 (pass) TERM-2 (fail) | none | Start inspection. |
| IMG-1 | ROI | FOV-1 (image) FOV-1 (position) | THR-1 (pass) TERM-2 (fail) | none | Create a region of interest (ROI) around the device. |
| THR-1 | CIL | (IMG-1) (image) | (pass) TERM-2 (fail) | none | Find a threshold with the ROI. |
| CPL-1 | BLOB | IMG-1 (image) FOV-1 (position) THR-1 (threshold) | FTX-1 (pass) TERM-2 (fail) | none | Using the threshold, use blob regions in the ROI to roughly find the device position. |
| FTX-1 | LSCAN | FOV-1 (image) CPL-1 (position) | FTC-1 (pass) OP-1 (fail) | lead set index 1 | Use the rough estimate of device position to locate lead features in the first FOV. If fail, try 2nd FOV. |
| FTC-1 | LCORR | FOV-1 (image) CPL-1 (position) FTX-1 (features) | FTF-1 (pass) OP-1 (fail) | none | Find a correspondence between all the lead features found so far. If fail, try 2nd FOV. |
| FTF-1 | LSQ | FOV-1 (image) CPL-1 (position) FTC-1 (features) | TERM-1 (pass) OP-1 (fail) | none | Use all the corresponded features found so far to fit the device and find its position. If fail, try 2nd FOV. |
| OP-1 | CLEAR | FOV-1 (tool) | FOV-2 (pass) FOV-2 (fail) | none | Get rid of image in FOV 1 to save on memory |
| FOV-2 | NEXT | FTF-1 (position) | APP-1 (pass) FOV-3 (fail) | none FOV). | (Get next FOV info. If fail, move on to final |
| APP-1 | REPEAT | FTX-1 (tool) | APP-2 (pass) | none | Repeat lead scan feature extraction in 2nd FOV. |

TABLE 4-continued

| SID (category, index) | TOOL (name) | DATA FLOW (inputs) | CONTROL FLOW (next step) | MODEL INDEX | COMMENT |
|---|---|---|---|---|---|
| | | FOV-2 (image) FOV-2 (position) | FOV-3 (fail) | | |
| APP-2 | REPEAT | FTC-1 (tool) FOV-2 (image) FTX-1, APP-1 (features) | APP-3 (pass) FOV-3 (fail) | none | Repeat lead correspondence for all features found so far. |
| APP-3 | REPEAT | FTF-1 (tool) FOV-2 (image) APP-2 (features) | OP-2 (pass) FOV-3 (fail) | none | Repeat feature fit in 2nd FOV. |
| OP-2 | CLEAR | FOV-2 (tool) | FOV-3 (pass) FOV-3 (fail) | none | Get rid of image in FOV 2 to save on memory. |
| FOV-3 | NEXT | FTF-1 (position) | FTX-2 (pass) TERM-2 (fail) | none | Get final FOV info. If fail, abort. |
| FTX-2 | LSCAN | FOV-3 (image) FOV-3 (position) | FTC-2 (pass) TERM-2 (fail) | lead set index 2 | Find lead features for 2nd lead set. |
| FTC-2 | LCORR | FOV-3 (image) FTX-1, APP-1, FTX-2 (features) | FTF-2 (pass) TERM-2 (fail) | none | Perform lead correspondence with all features found so far. |
| FTF-2 | LSQ | FTF-1 (tool) FOV-3 (image) FTC-2 (features) | TERM-1 (pass) TERM-2 (fail) | none | Perform a final fit (using different parameters). |
| TERM-1 | DONE | FTF-2 (position) | any | none | Inspection finished with no error. |
| TERM-2 | ABORT | FOV-3 (position) | any | none | The inspection finshed with error. finished with error |

What is claimed is:

1. A computer-readable medium encoded with a program, said program comprising:
    a set of step tools from which a set of step objects is instantiated, said set of step objects comprising machine vision step objects that comprise routines for processing an image of an article to provide article feature information;
    a control flow data structure for charting a flow of control among said step objects, said control flow data structure comprising a control flow connection, said control flow connection providing access to portions of said control flow data structure for at least one of individual accessing and individual defining of a following step object specified to follow a given step object; and
    a data flow data structure for charting a flow of data among said step objects, said data flow data structure comprising a data flow connection, said data flow connection providing access to portions of said data flow data structure for at least one of individual accessing and individual defining of a data source for a given step object.

2. A computer system for developing on a computer-readable medium an article assessment program that identifies and assesses features of an article, said computer system comprising:
    a user interface;
    a class definer for defining on said computer-readable medium a class of objects based upon geometric features of said article;
    a computer-readable step tool library, said step tool library comprising step tools from which step objects are instantiated, said step objects comprising machine vision step objects comprising routines for processing an image of said article to provide article feature information, respective ones of said step objects comprising at least one routine defining and controlling execution of said article assessment program;
    an instantiator for instantiating said step object;
    a control flow data structure and means for interfacing said user interface to said control flow data structure to chart a flow of control among said step objects, by a user specifying for a given individual step object a following step object that will next define and control execution of the article assessment program; and a data flow data structure and means for interfacing said user interface to said data flow data structure to chart a flow of data among said step objects, by a user specifying a data source for a given step object.

3. The computer system according to claim 2, wherein said step tools comprise machine vision step tools from which machine vision step objects are instantiated and program flow step tools from which program flow step objects are instantiated, said machine vision step objects comprising routines for processing an image of said article to provide article feature information, and said program flow step objects comprising routines for managing transitions to or from said machine vision step objects.

4. The computer system according to claim 2, wherein said flow of control is specified by separately specifying for a given individual step object a first following step object for one type of result of a routine of said given step object and a second following step object for another type of result of the routine of said given step object.

5. The computer system according to claim 2, wherein said computer system comprises a program loaded in memory.

6. The computer system according to claim 2, wherein said article comprises a part, and said assessing of features comprises inspecting said part for defects in certain features of said part.

7. The computer system according to claim 2, wherein said article comprises a surface mount device, and said assessing of features comprises inspecting said surface mount device for defects in certain features of said surface mount device.

8. The computer system according to claim 2, wherein said article comprises a surface mount device, and said assessing of features comprises determining a position of said surface mount device in relation to a mounting system for mounting said surface mount device to a circuit board.

9. The computer system according to claim 8, wherein said assessing of features further comprises determining a position of said surface mount device in relation to a mounting system for mounting said surface mount device to a circuit board.

10. The computer system according to claim 2, wherein said step objects comprise at least two output statuses, including a PASS status and a FAIL status, said control flow data structure comprising a structure for designating that the following step object comprises a first following step when the given step object comprises a PASS status and that the following step object comprises a second following step when the given step object comprises a FAIL status.

11. A computer-readable medium encoded with an article assessment program for identifying features of an article, said program comprising:

a set of step objects comprising machine vision step objects that comprise routines for processing an image of said article to provide article feature information;

a control flow data structure for charting a flow of control among said step objects, said control flow data structure comprising a control flow connection, said control flow connection providing access to portions of said control flow data structure for at least one of individual accessing and individual defining of a following step object specified to follow a given step object; and a data flow data structure for charting a flow of data among said step objects, said data flow data structure comprising a data flow connection, said data flow connection providing access to portions of said data flow data structure for at least one of individual accessing and individual defining of a data source for a given step object.

12. A computer system comprising a subsystem for executing from a computer-readable medium a program for identifying and assessing features of an article, said subsystem comprising:

a user interface;

computer-readable calibration data;

a computer-readable article model comprising information representing certain characteristics of said article;

a set of instantiated step objects comprising machine vision step objects that comprise routines for processing an image of said article to provide article feature information;

computer-readable image data representing at least one field of view of a digital image of said article;

a control flow data structure for charting a flow of control among said step objects, said control flow data structure comprising a control flow connection, said control flow connection providing access to portions of said control flow data structure for at least one of individual accessing and individual defining of a following step object specified to follow a given step object; and a data flow data structure for charting a flow of data among said step objects, said data flow data structure comprising a data flow connection, said data flow connection providing access to portions of said data flow data structure for at least one of individual accessing and individual defining of a data source for a given step object.

13. The computer system according to claim 12, wherein certain ones of said step objects comprise parameters representative of said article in device space.

14. The computer system according to claim 12, wherein said computer-readable article model comprises a data structure shared by multiple ones of said step objects.

15. The computer system according to claim 12, wherein said computer system further comprises a central controller for obtaining and providing FOV data to said subsystem, said subsystem providing guidance information to said central controller to guide the obtention of said FOV data.

16. The computer system according to claim 14, wherein said step objects further comprise program flow step objects, said machine vision step objects comprising routines for processing an image of said article to provide article feature information, and said program flow step objects comprising routines for managing transitions among said machine vision step objects and said central controller, said transitions comprising transferring FOV data between certain ones of said machine vision step objects and said central controller.

17. A computer-readable medium encoded with a program for developing, on at least one of said computer-readable medium and another computer-readable medium, an article assessment program for identifying features of an article, said program comprising:

a class definer for a class of objects based upon geometric features of said article;

a step tool library comprising step tools from which step objects are instantiated, said step objects comprising machine vision step objects comprising routines for processing an image of said article to provide article feature information, respective ones of said step objects comprising at least one routine defining and controlling execution of said article assessment program;

an instantiator for instantiating said step object;

a control flow data structure for charting a flow of control among said step objects, said control flow data structure comprising a control flow connection, said control flow connection providing access to portions of said control flow data structure for at least one of individual accessing and individual defining of a following step object specified to follow a given step object; and a data flow data structure for charting a flow of data among said step objects, said data flow data structure comprising a data flow connection, said data flow connection providing access to portions of said data flow data structure for at least one of individual accessing and individual defining of a data source for a given step object.

18. A computer-readable medium encoded with a program, said program comprising:

a plurality of step tools configured to instantiate a plurality of step objects, said plurality of step objects comprising machine vision step objects that comprise routines for processing an image of an article to provide article feature information;

a control flow data structure for defining a flow of control between at least two of said plurality of step objects, said control flow data structure comprising a control flow connection, said control flow connection providing access to portions of said control flow data structure for at least one of accessing and defining of a following step object specified to follow a given step object;

a data flow data structure for defining a flow of data between at least two of said plurality of step objects, said data flow data structure comprising a data flow connection, said data flow connection providing access to portions of said data flow data structure for at least one of accessing and defining of a data source for a given step object, and computer instructions that, when executed by a processor, generate a graphical representation of at least one of the control flow data structure and the data flow data structure.

19. The computer-readable medium of claim 18, wherein the flow of control defined by the control flow data structure defines a flow of control between at least three of said plurality of step objects, said control flow data structure comprising at least two control flow connections comprising a first control flow connection and a second control flow connection, the first control flow connection connecting the given step object and a first following step object and the second control flow connection connecting the given object and a second following step object, said control flow data structure including information indicating that a flow of control from the given step object to the following step object results in a flow of control from the given step object to one of the first and second following step objects based on the results generated by an image processing routine included in the given step object.

20. The computer-readable medium of claim 18, wherein the graphical representation is configured to serve as a diagnostic feedback to a user by graphically displaying an inspection program.

21. The computer-readable medium of claim 18, wherein the graphical representation is configured as a graphical mechanism for specifying a flow of data or control by allowing a user to graphically connect inspection steps to each other.

22. The computer-readable medium of claim 18, wherein the graphical representation of the control flow data structure illustrates flow of control between at least two step objects of the plurality of step objects.

23. The computer-readable medium of claim 22, wherein the at least two step objects illustrated in the graphical representation of the control flow data structure are represented as nodes.

24. The computer-readable medium of claim 23, wherein the flow of control between the at least two step objects illustrated in the graphical representation is illustrated as a graphical connection between the two nodes corresponding to the two step objects.

25. The computer-readable medium of claim 24, wherein the graphical connection between the two nodes is an arc.

26. The computer-readable medium of claim 18, wherein the graphical representation of the data flow data structure illustrates flow of data between at least two step objects of the plurality of step objects.

27. The computer-readable medium of claim 26, wherein the at least two step objects illustrated in the graphical representation of the data flow data structure are represented as nodes.

28. The computer-readable medium of claim 27, wherein the flow of data between the at least two step objects illustrated in the graphical representation is illustrated as a graphical connection between the two nodes corresponding to the two step objects.

29. The computer-readable medium of claim 28, wherein the graphical connection between the two nodes is an arc.

30. A computer system configured to develop, on a computer-readable medium, an article assessment program that identifies and assesses features of an article, said computer system comprising:

a user interface;

a class definer for defining on said computer-readable medium a class of objects based upon geometric features of said article;

a computer-readable step tool library, said step tool library comprising a plurality of step tools configured to instantiate a plurality of step objects, said plurality of step objects comprising machine vision step objects comprising routines for processing an image of said article to provide article feature information;

a control flow data structure defining a flow of control between at least two step objects of the plurality of step objects by specification for a given step object of at least one following step object that will next define and control execution of the article assessment program, said user interface being operationally coupled to said control flow data structure; and a data flow data structure defining a flow of data between at least two step objects of the plurality of step objects by specification of a data source for at least one of the two step objects, said user interface being operationally coupled to said data flow data structure; and wherein the computer system further comprises a graphical user interface that is configured to display a graphical representation of at least one of the control flow data structure and the data flow data structure.

31. The computer system of claim 30, wherein the graphical representation of the control flow data structure illustrates flow of control between at least two step objects of the plurality of step objects.

32. The computer system of claim 30, wherein the graphical representation of the data flow data structure illustrates flow of data between at least two step objects of the plurality of step objects.

33. The computer system of claim 30, wherein the graphical representation is configured to serve as a diagnostic feedback to a user by graphically displaying an inspection program.

34. The computer system of claim 30, wherein the graphical representation is configured as a graphical mechanism for specifying a flow of data or control by allowing a user to graphically connect inspection steps to each other.

35. The computer system of claim 30, wherein each of said step objects comprises at least one routine defining and controlling execution of said article assessment program.

36. The computer system of claim 30, wherein specification of said flow of control separately specifies, for a given step object, a first following step object for one type of result of a routine of said given step object and a second following step object for another type of result of the routine of said given step object.

37. The computer system of claim 30, wherein the graphical representation of the control flow data structure illustrates flow of control between at least two step objects of the plurality of step objects.

38. The computer system of claim 37, wherein the at least two step objects illustrated in the graphical representation of the control flow data structure are represented as nodes.

39. The computer system of claim 38, wherein the flow of control between the at least two step objects illustrated in the graphical representation is illustrated as a graphical connection between the two nodes corresponding to the two step objects.

40. The computer system of claim 39, wherein the graphical connection between the two nodes is an arc.

41. The computer system of claim 40, wherein the graphical representation of the data flow data structure illustrates flow of data between at least two step objects of the plurality of step objects.

42. The computer system of claim 41, wherein the at least two step objects illustrated in the graphical representation of the data flow data structure are represented as nodes.

43. The computer system of claim 42, wherein the flow of data between the at least two step objects illustrated in the graphical representation is illustrated as a graphical connection between the two nodes corresponding to the two step objects.

44. The computer system of claim 43, wherein the graphical connection between the two nodes is an arc.

* * * * *